United States Patent [19]

Leger et al.

[11] Patent Number: 5,820,055
[45] Date of Patent: Oct. 13, 1998

[54] TAPE LIBRARY CARTRIDGE MANIPULATION APPARATUS

[75] Inventors: Gregory S. Leger; Scott R. Patterson, both of Colorado Springs; Ryan S. Porter, Monument; Joseph A. Stabile, Colorado Springs, all of Colo.

[73] Assignee: Philips Electronics North America Corporation, New York, N.Y.

[21] Appl. No.: 716,684

[22] Filed: Sep. 16, 1996

[51] Int. Cl.$^6$ .................................................. G11B 15/68
[52] U.S. Cl. ............................................................ 242/337
[58] Field of Search ................................... 242/337, 338, 242/338.6; 360/92

[56] References Cited

U.S. PATENT DOCUMENTS 4,452,406  6/1984  Richard .
5,274,516  12/1993  Kakuta et al. ............................. 360/92

Primary Examiner—John P. Darling

[57] ABSTRACT

A compact x-y position system employing a cantilevered frame for carrying an elevator, a gripper with z-axis motion capability mounted to the elevator and cartridge handling and storage including multiple removable magazines and a mailbox for cartridge insertion and disgorgement provide a complete cartridge manipulation apparatus for tape libraries. The x-y position system includes a y-axis rail with unlimited vertical expansion capability and a cantilevered x-axis frame mountable within a standard 19" electronics rack. The gripper mounted to an elevator carried by the x-axis frame is bidirectionally translatable in a z axis and includes a traction assembly having a belt drive train and reaction rollers for cartridge handling. The mailbox incorporates an aperture in an exposed face of the library with a movable door for blocking access to an interior bay of the tape library. An ejection mechanism is incorporated for cartridges inserted into the mailbox by the gripper. The movable door and ejection mechanism are both operable by the gripper. Multiple magazines, each having a vertically stacked series of cartridge storage slots, are mounted within the library, and sensors for a library closure door and individual access to the magazines allows efficient cartridge configuration control.

47 Claims, 20 Drawing Sheets

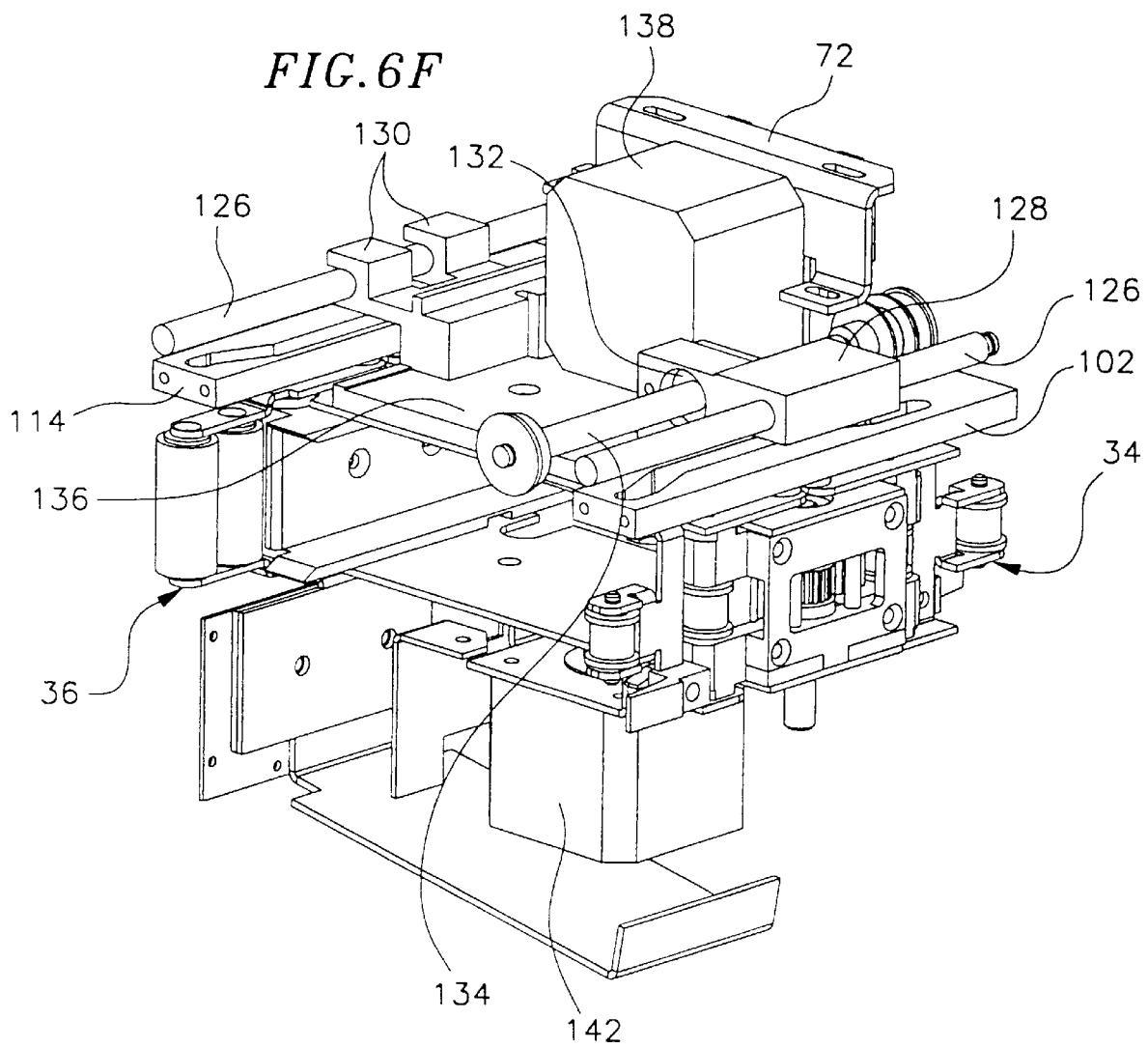

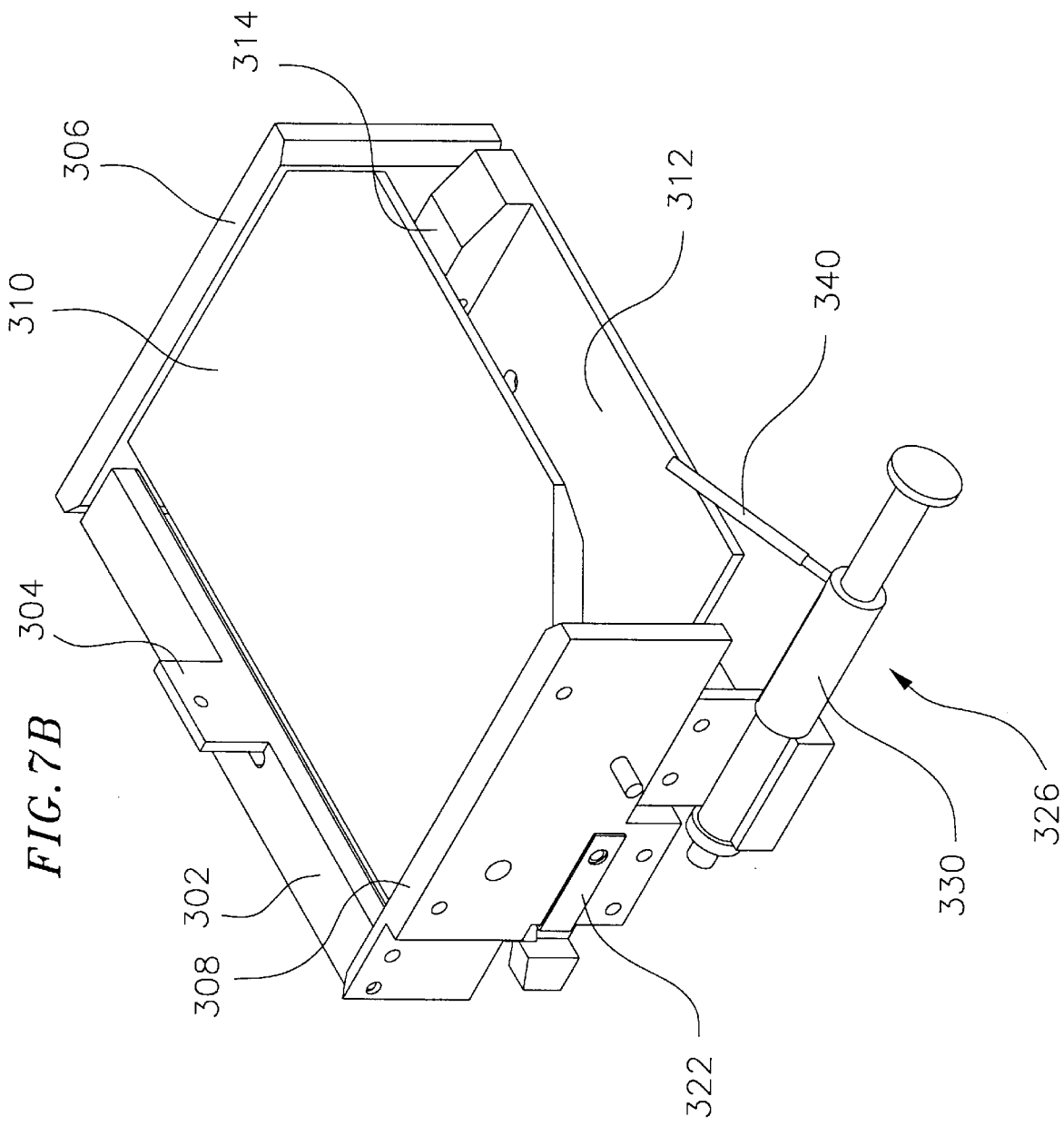

TAPE LIBRARY CARTRIDGE MANIPULATION APPARATUS

BACKGROUND OF THE INVENTION

1. Field of the Invention

The present invention relates generally to multiple cassette tape storage libraries with random access cartridge handling. More particularly, the invention provides a compact footprint tape cartridge handling system employing an elevator having x, y, and z motion capability with (a) a cassette mailbox provided for insertion and retrieval of individual cassettes and (b) multiple magazines for cassette storage employing a cartridge release lever engaged by the elevator mechanism for release of individual cartridges from the magazine. The mailbox incorporates an internal access door actuated by the elevator during retrieval or deposit of a cassette in the mailbox and an ejection device engaged and operated by the elevator mechanism.

2. Description of Related Art

Magnetic tape storage libraries employed for off-line storage of data for archival or short term backup predominantly employ single reel tape cartridges such as the Model 3480 tape cartridge developed by IBM corporation or the Quantum/Digital DLT cartridge. Operation of the IBM 3480 tape cartridge is disclosed in U.S. Pat. No. 4,452,406. The DLT cartridge employs similar functional characteristics with slightly smaller width and length dimensions than the 3480 cartridge. Each cartridge includes a single reel containing a quantity of magnetic tape stored in a substantially rectangular enclosure with an aperture on one major face to receive a rotating capstan for the tape reel. An aperture in one corner of the cartridge allows access to the free end of the tape web by the tape transport unit.

Individual tape transport units are well known in the industry and the development of tape libraries was accomplished to allow automatic retrieval of cartridges for insertion into one or more tape transport units. Initial tape libraries employed vertical arrays of tape cartridges which could be sequentially dropped into a loading position for introduction into an associated tape transport unit. After use, each tape cartridge was then ejected from the tape transport unit and received in a collection area. However, such approaches lacked random access capability. Storage devices employing magazines capable of accepting an array of tape cartridges were developed with vertical movement of the cartridges relative to a stationary tape transport unit employed for positioning selected tape cartridges. These devices typically require significant vertical space to provide magazine actuation travel.

True random access capability has been provided through tape storage libraries employing magazines having vertically stacked cartridges accessible by an elevator retrieval mechanism which transports cartridges to and from the magazine and tape drive unit. Exemplary of this type of storage library is the Philips Laser Magnetic Storage Division (LMS) "Cartridge Stacker Loader" (CSL).

It is desirable to provide multiple magazine capability for increased cartridge storage while maintaining minimal height and footprint for the tape storage library. While tape storage libraries employing multiple access retrieval mechanisms for separate vertical stacks of cartridges are in commercial development, such devices typically require non-standard footprint sizes due to mechanical operating constraints. It is therefore desirable to provide a multiple magazine tape storage library employing a multiple access retrieval system capable of supplying cartridges to multiple tape transport units on a random access basis while maintaining a footprint suitable for mounting in conventional equipment rack dimensions.

The use of multiple magazines provides additional complexity in inventorying of cartridges stored in the library. It is desirable that cassettes be individually removable from the magazines without magazine removal and that magazines be removable for group handling of cartridges. To obtain configuration control of cartridges stored in the library, it is therefore desirable that the tape library incorporate a separate cartridge insertion and removal port or mailbox to allow automated positioning of cartridges by the tape library system. Additionally, sensing of general access to the magazines and individual magazine removal or replacement or individual cartridge removal or replacement from a magazine is desirable for recovering configuration control when the mailbox is not employed.

Cartridge retaining mechanisms on magazines employed within the tape library must allow access to and removal of the cartridge from the front of the magazine by an operator/user and from the rear of the magazine by the cartridge manipulation mechanism. Pass-through retaining mechanisms such as that employed in the Philips LMS CSL tape storage library have demonstrated satisfactory performance. However, it is desirable to provide the capability for release of the retention mechanism which is self-aligning and can tolerate dimensional variation imposed by operation of the cartridge retrieval mechanism.

SUMMARY OF THE INVENTION

A tape storage library incorporating the present invention employs multiple cartridge magazines, each providing vertically distributed slots for cartridge storage. The magazines are arranged in adjacent, horizontal relation providing an x-y array of cartridges in the tape storage library. The magazines are removably restrained in a frame mounted in a front bay of the tape storage library.

A cartridge retrieval mechanism positioned in an open bay rearwardly adjacent the magazine frames includes an x-axis frame supporting an elevator platform which incorporates a gripper mechanism for retrieval of individual cartridges. The elevator platform translates along the x-axis frame defining a first motion axis.

The x-axis frame is cantilevered from a pillow block assembly which translates along a y-axis rail defining the second axis of motion for the cartridge retrieval assembly. Rotation of the cantilevered x-axis frame about the y-axis rail is restrained by a slotted guide mounted proximate one end of the x-axis frame which receives a vertical flange mounted parallel to the y-axis rail.

A gripper for cartridge handling is mounted to the elevator. The gripper is aligned with individual cartridges contained within the magazines by the x and y motion of the elevator and similarly positioned for placement of cartridges in a tape transport unit. A plurality of tape transport units is mounted in a bay rearwardly adjacent the bay containing the x-axis frame. The gripper mechanism provides pass through handling of tape cartridges for insertion and removal from the tape transport units.

The gripper of the present invention includes a traction assembly for frictionally engaging a cartridge and drawing cartridge through the gripper. The gripper is mounted on an elevator with a mounting plate bidirectionally translatable in a z axis perpendicular to an x-y array of cartridges. The mounting plate is translated using a stepper motor mounted to the elevator or gripper frame.

The traction assembly includes a belt drive train mounted to a first side of the gripper frame. The drive train supports a belt for frictionally engaging a cartridge. A reaction roller assembly is mounted to a second side of the gripper frame opposite the belt drive train in spaced relation to cooperatively engage a second side of the cartridge.

An x-y positioning system incorporating the present invention is adapted to carry an elevator mounting the gripper to engage and pass through the cartridges, and includes an x axis frame having a back plate terminating at a first end in a first end plate and at a second end in a second end plate. A pillow block is mounted to the back plate intermediate the first and second ends and a y axis rail is received through the pillow block, extending from the floor of the tape library to a vertical extent proximate a y dimension of an x-y array of cartridge storage locations, providing a centrally cantilevered mounting of the x axis frame. A rotation preventer for the x axis frame is mounted proximate the first end of the back plate. An x axis drive motor is mounted intermediate the pillow block and the second end of the back plate and interconnected to plate mounting a cartridge elevator to the x axis frame for translating motion in the x axis. A y-axis stepper motor and lead screw is provided for translating the pillow block on the y axis rail.

A cartridge handling and storage apparatus for a tape library incorporating the present invention includes a mailbox for receiving and disgorging cartridges from the tape library. The mailbox includes an aperture in an exposed face of the library and a door for blocking access to an interior bay of the tape library which is movable for passing cartridges through the mailbox. An ejecting mechanism is provided for cartridges inserted into the mailbox by the cartridge handling system.

In the library, a plurality of removable cartridge storage magazines are arranged in an x-y array with each having a plurality of vertically spaced cartridge storage slots. A closure bar for preventing removal of cartridges from the front of the magazine is provided which is movable for manually extracting cartridges. Each magazine also includes a mechanism for releasing cartridges from the magazine for extraction from a rear of the magazine.

A closure door is provided for the library which is movable from a closed position to an open position with the door covering the fronts of said magazines in the closed position. The manipulating system moves cartridges between the mailbox, magazine storage slots and at least one tape drive internal to the tape library and is translatable in x, y and z axes.

For interface with the cartridge handling and storage apparatus, the manipulation system includes a means for moving the blocking door, a means for engaging the releasing means on each magazine, and a means for actuating the ejecting mechanism on the mailbox. In addition, a sensor for presence of the closure bar for each of the plurality of magazines in a closed position is actuated by opening of the closure bar or removal of the magazine. A door position detector is activated by movement of the door from the closed position to the open position and cartridge configuration is assessed by the system responsive to actuation of the closure bar sensor and the door position detector.

BRIEF DESCRIPTION OF THE DRAWINGS

The present invention is best understood with reference to the following drawings and detailed description wherein

FIG. 6f is a front perspective view of the elevator assembly with the elevator platform and associated frames removed to display underlying components;

FIG. 7b is a right rear perspective view of the mailbox assembly;

DETAILED DESCRIPTION OF THE INVENTION

Figure 1:
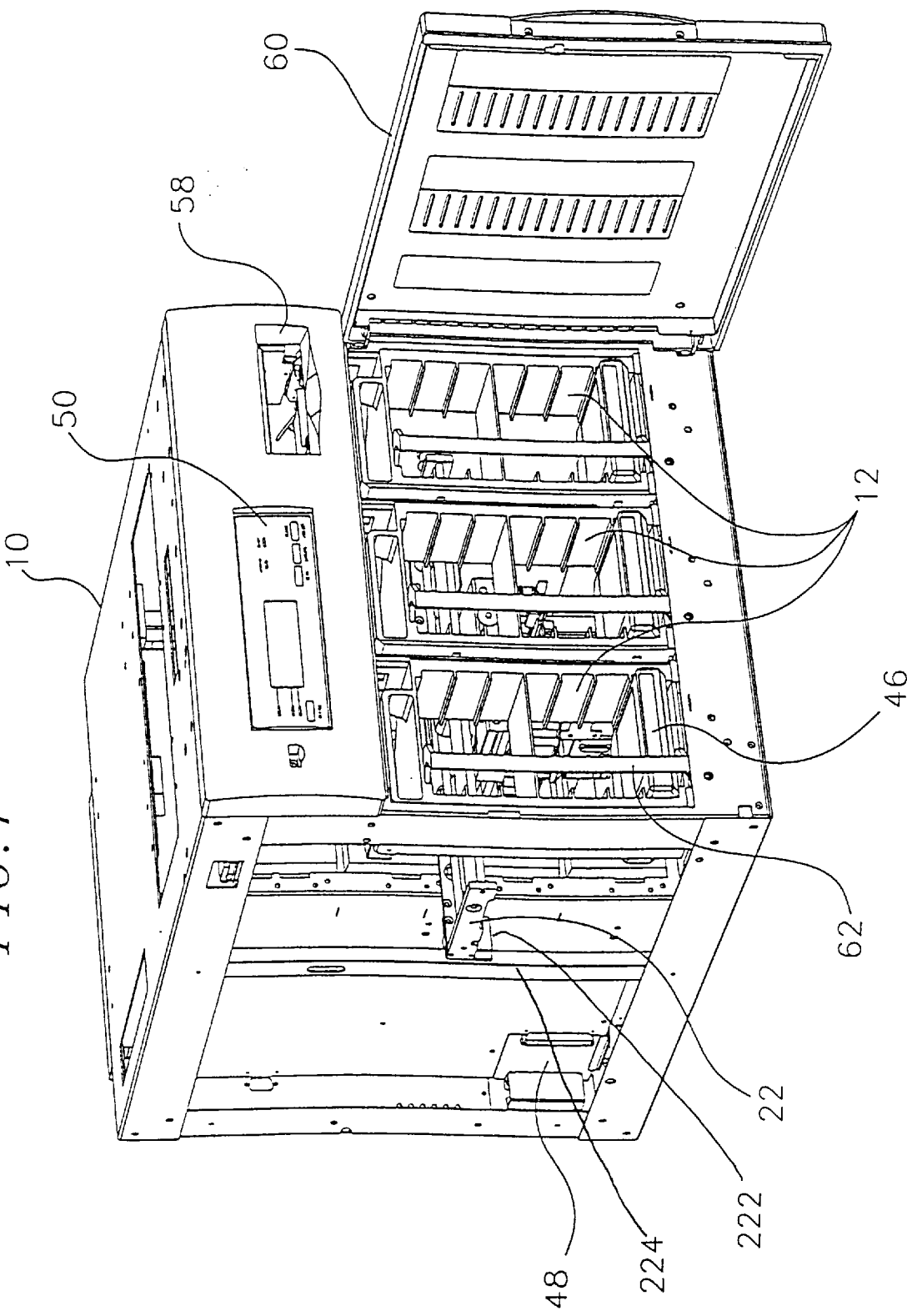
FIG. 1 is a front pictorial view of a tape library incorporating the present invention with the front door and left side panel removed.

Referring to the drawings, FIGS. 1–4 disclose a multi-cartridge tape library incorporating the present invention. The library is housed in an enclosure 10 which, in the embodiment disclosed in the drawings, is suitable for mounting in a conventional 19 inch electronic equipment rack. As best seen in FIG. 1, the present embodiment employs three cartridge magazines 12 which are mounted in frames 14 in a front bay or portion of the enclosure designated 16. A cartridge manipulation unit 18 is mounted in a second bay of the enclosure generally designated 20 immediately rearward of the magazine bay. The cartridge manipulation unit includes an x-y position system which incorporates an x-axis frame 22 and a y-axis rail 24. The x-axis frame is cantilevered from a pillow block assembly 26 carried by the y-axis rail. An elevator assembly 28 is supported by the x-axis frame. Translation of the elevator assembly along the x-axis frame defines a first motion axis for the cartridge manipulation system. Translation of the pillow block assembly on the y-axis rail defines a second axis of motion for the cartridge manipulation system.

Figure 2:
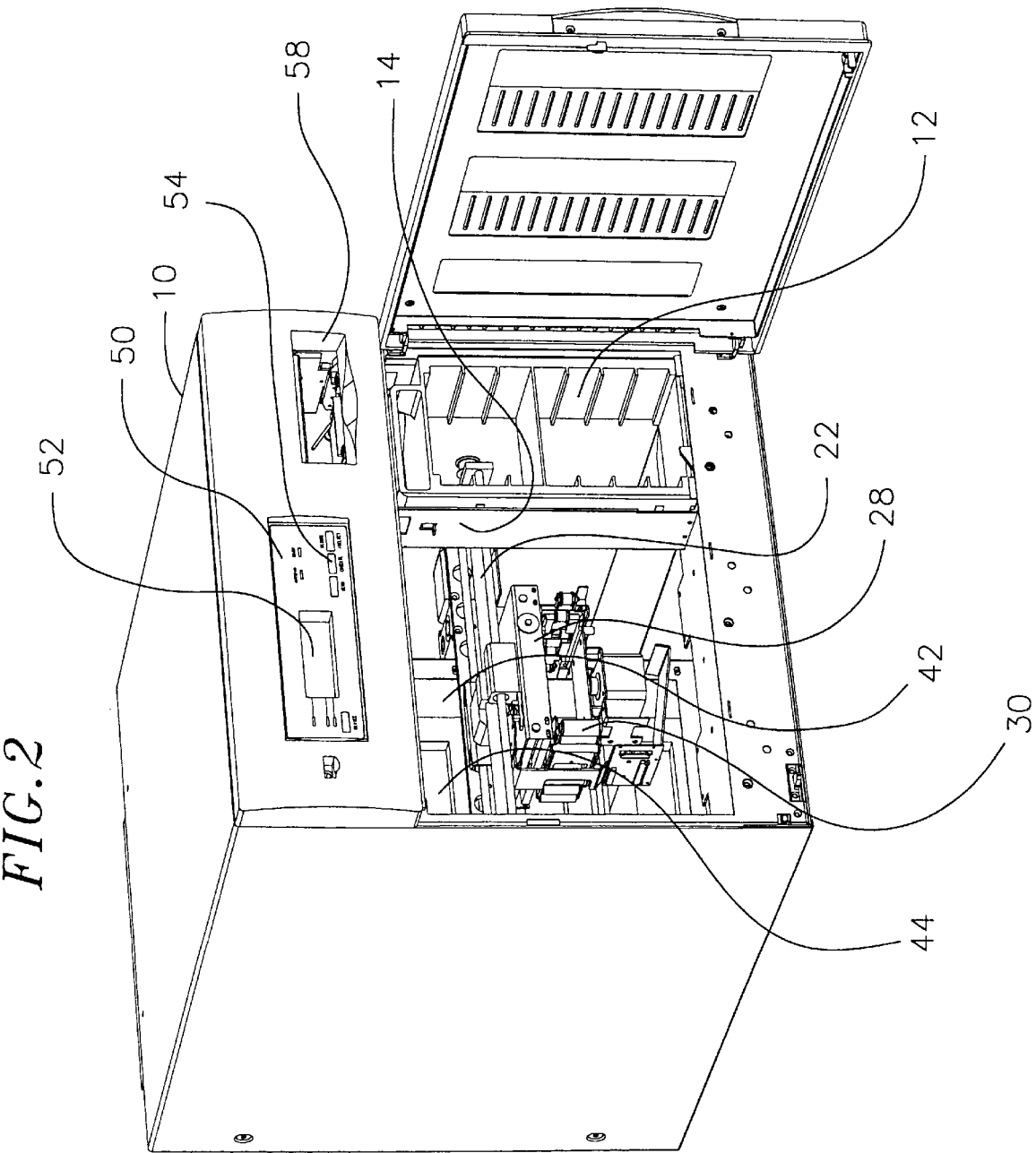
FIG. 2 is a front pictorial view of the tape library of FIG. 1 with two magazines and their associated frames removed to display the cartridge retrieval mechanism.

The elevator assembly incorporates a gripper mechanism 30 for retrieval of individual tape cartridges. The gripper mechanism is movably mounted to an elevator platform 32 and provides a belt drive train 34 which cooperates with opposing roller assembly 36. Details of the elevator assembly are best seen in FIGS. 6a–6h. The gripper assembly translates on a third motion axis providing +z and −z motion for the cartridge manipulation assembly. Relative position of the elevator assembly in the library is best seen in FIG. 2 which provides a front isometric view of the enclosure with two magazines and their associated mounting frame removed. A tape cartridge 46 shown carried within the gripper assembly.

A third bay in the enclosure generally designated 38 houses four tape drive units 40 for the embodiment shown in the drawings. Each tape drive is integrally mounted in a support chassis received in frame 42 within the enclosure. The cartridge insertion aperture 44 of each tape drive unit is exposed to the cartridge manipulation system operating in the immediately adjacent bay.

An electronics board 48 is mounted in the aft bay of the library enclosure adjacent the tape drive stack in the embodiment shown in the drawings. A central processing unit, memory and electronic control circuitry for the library are mounted on the controller board. Operator interface is accomplished through a control panel 50 mounted on the front face of the enclosure which includes a display 52 for communication with the operator and input keys 54 for manual input by the operator. Communications by the tape library with a user network or other computer devices is accomplished through industry-standard communications interfaces.

Figure 3:
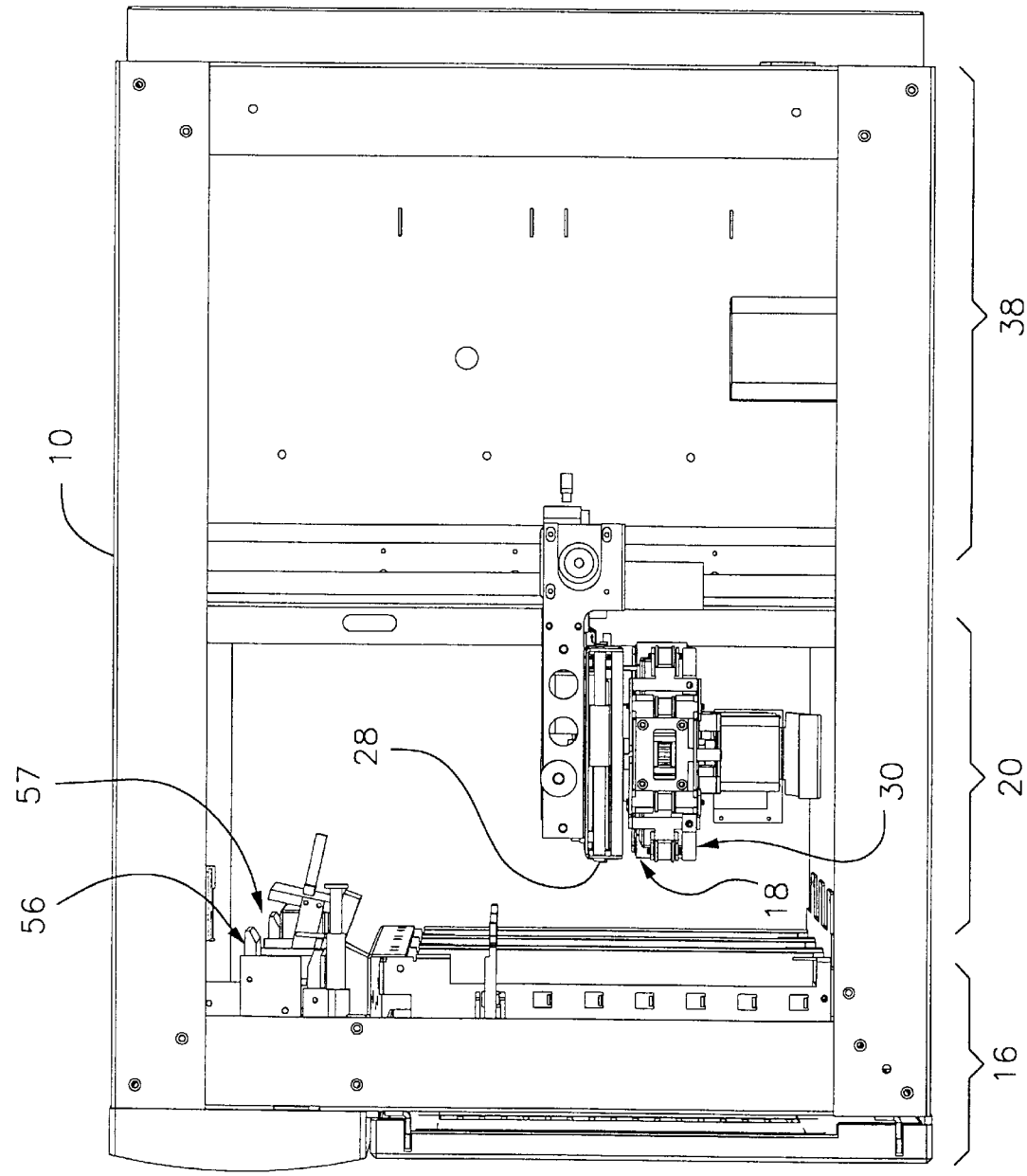
FIG. 3 is a right side pictorial view of the tape library with the side panel removed.
Figure 7A:
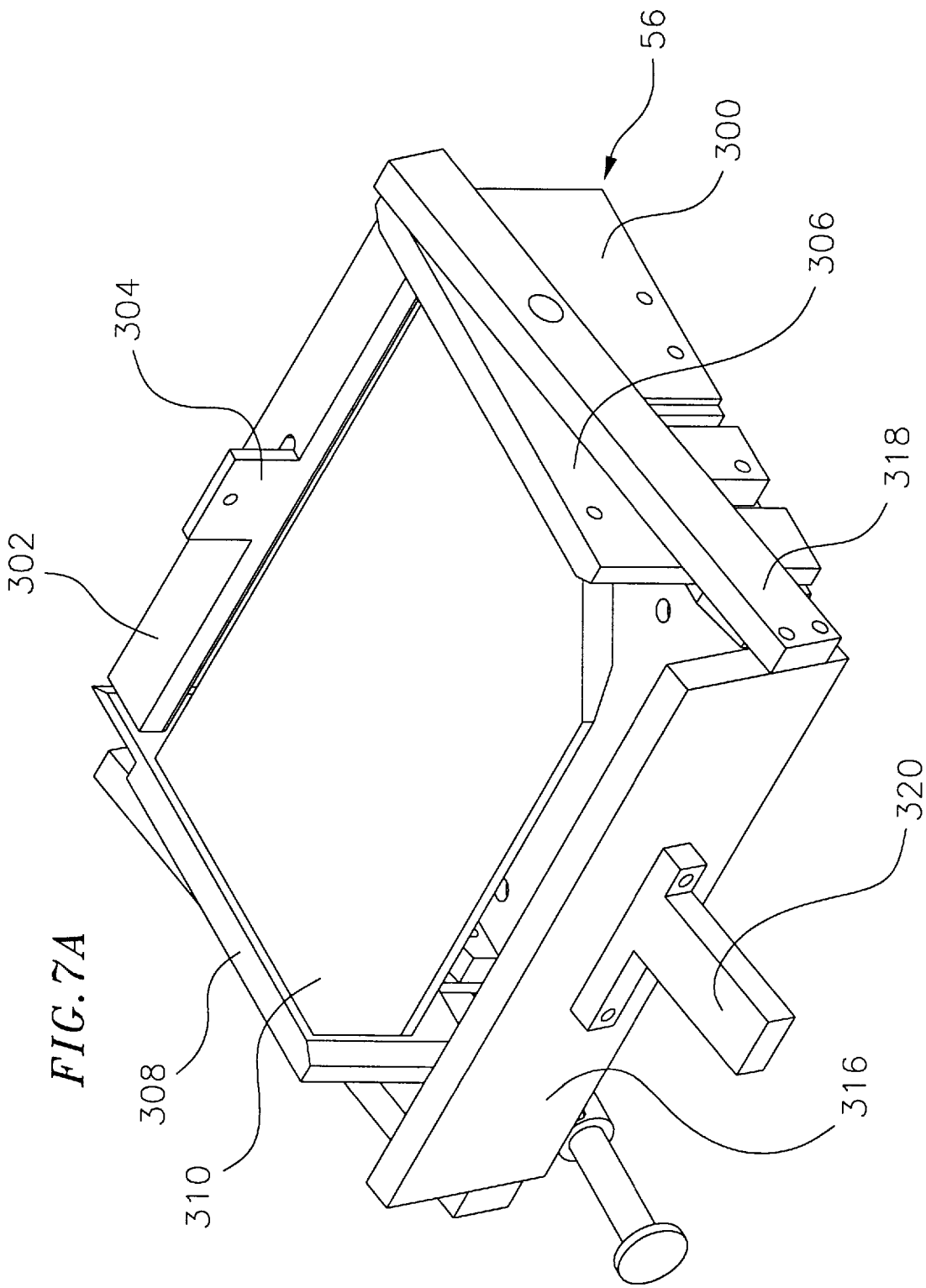
FIG. 7a is a left rear perspective view of the mailbox assembly.
Figure 7C:
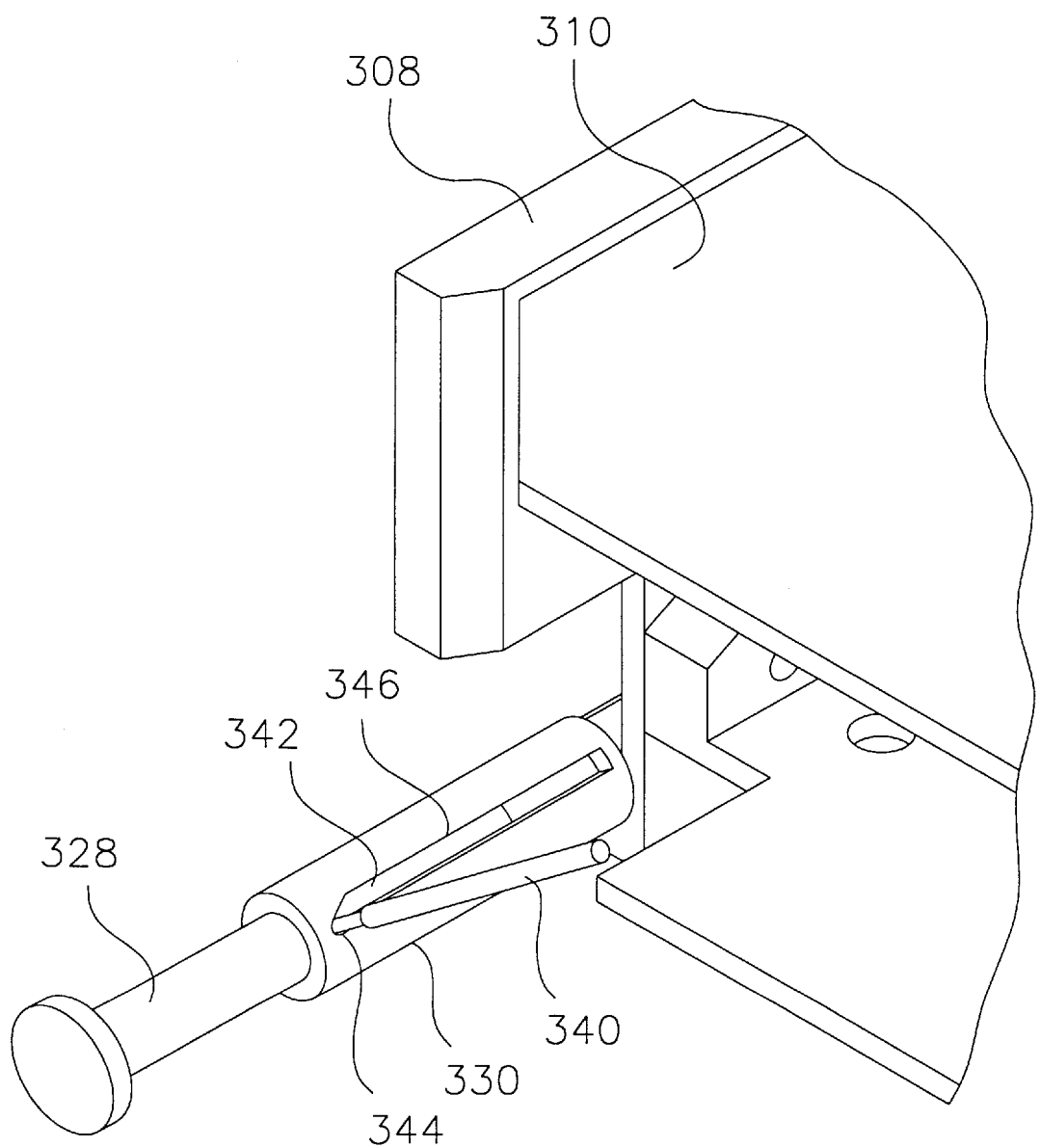
FIG. 7c is a partial perspective view showing the cartridge ejection assembly.

A tape cartridge mailbox assembly 56, seen in FIG. 3 and shown in detail in FIGS. 7a–7c, is included in the tape library to allow automated handling of cartridges for individual insertion and removal from the library. A "Zero slot" 57, having a structure substantially identical to the mailbox but without exterior access, is provided for cartridge temporary storage during manipulation processes. The mailbox assembly incorporates a cartridge receiving aperture 58 on the library front face. Cartridges inserted to the mailbox are retrieved by the cartridge manipulation assembly for direct placement in a tape drive assembly or cataloguing in an open magazine slot. Similarly, tape cartridges retrieved by the manipulation assembly from the tape drive or a magazine location are unloaded from the library through the mailbox to be retrieved by an operator.

The tape library as disclosed in the drawings also allows manual cartridge manipulation by an operator through door 60, which exposes the three magazines when opened. The individual magazines are removable from the library, allowing handling of cartridges in seven-unit multiples, and individual cartridges are removable from the magazines directly by rotation of the cartridge stop 62, best seen in and described in detail with regard to FIG. 9, into an open position, allowing access to individual cartridges stored in the magazine.

ELEVATOR PLATFORM AND GRIPPER MECHANISM

Figure 5:
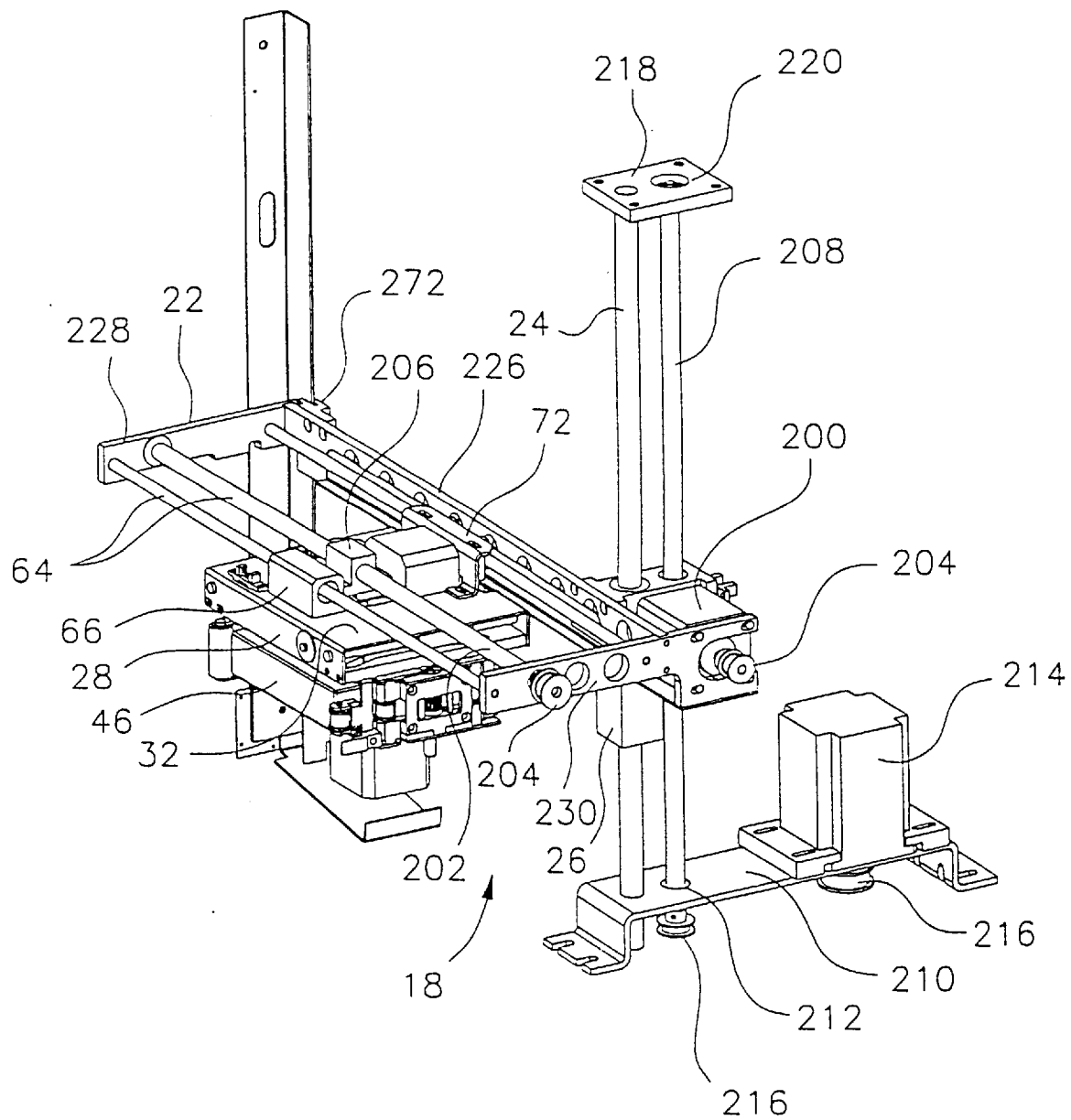
FIG. 5 is a pictorial view of the cartridge retrieval mechanism.

As best seen in FIG. 5, the elevator assembly is carried by the x-axis frame 22, which incorporates two parallel guide rails 64. One rail is traversed by a linear bearing 66 which is mounted to the top of the elevator platform. The second rail is engaged by C-shaped glider 68, best seen in FIG. 6c, and inverted J-shaped glider 70, best seen in FIG. 6d. The gliders are adjustably mounted to bracket 72, which is in turn mounted to the elevator platform. The J and C shaped gliders contact the second rail tangentially at the top of the rail thereby providing tolerance relief for spacing of the guide rails. The entire elevator assembly traverses along the x-axis frame while the x-axis frame is in turn translated along the y-axis rail for positioning of the gripper assembly in an x-y plane for cartridge manipulation alignment.

Figure 6A:
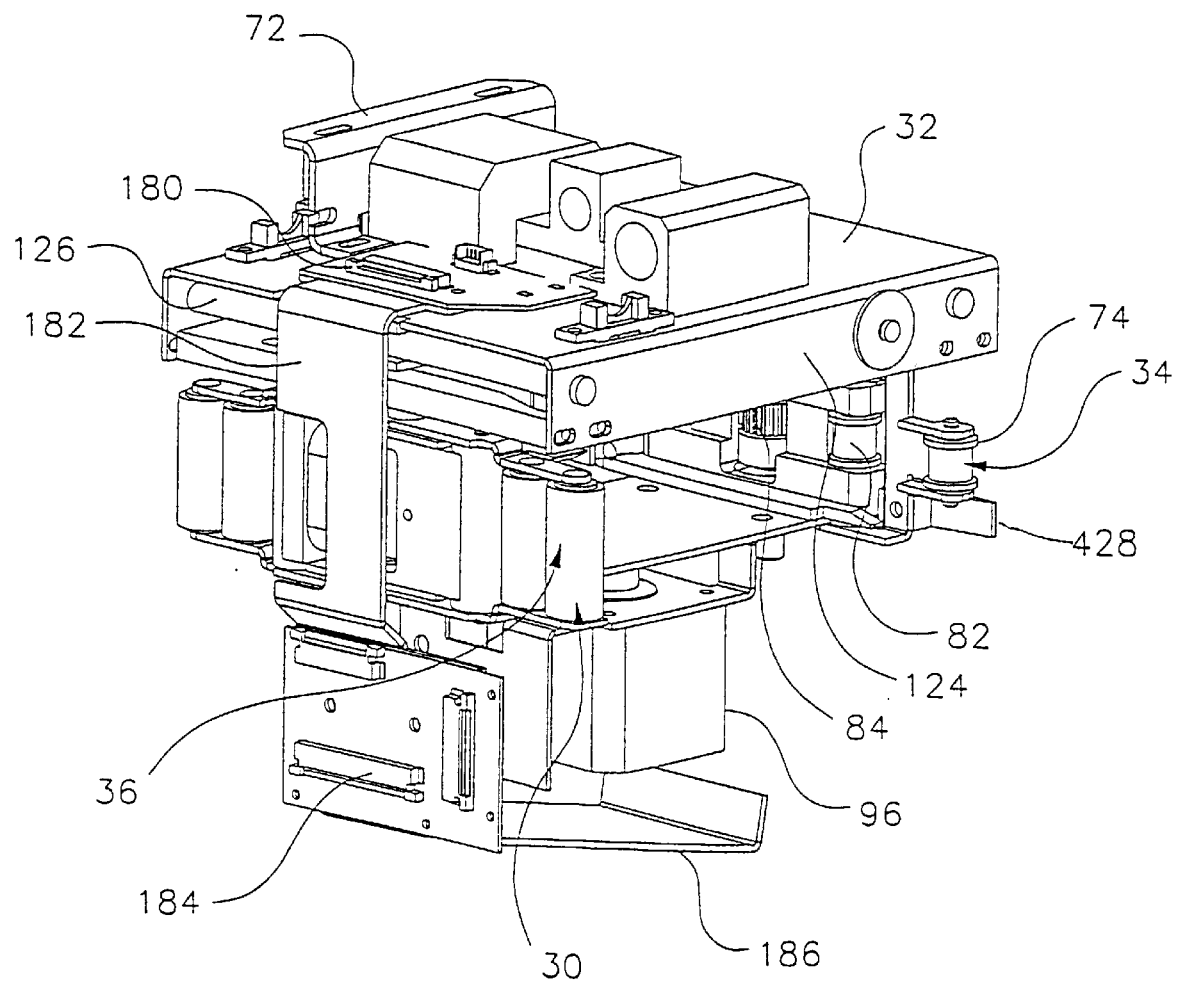
FIG. 6a is a front perspective view of the elevator assembly.
Figure 6B:
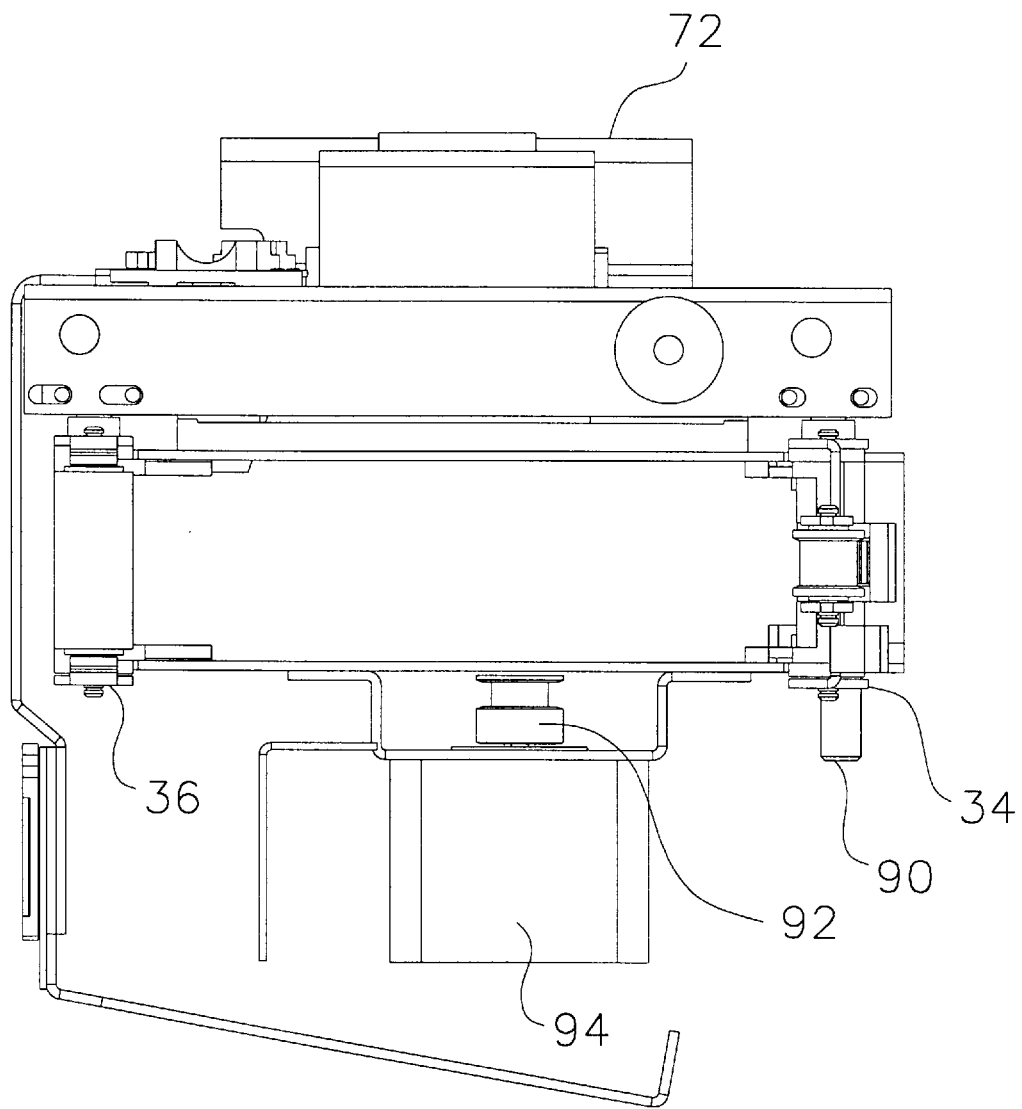
FIG. 6b is a front elevational view of the elevator assembly.
Figure 6C:
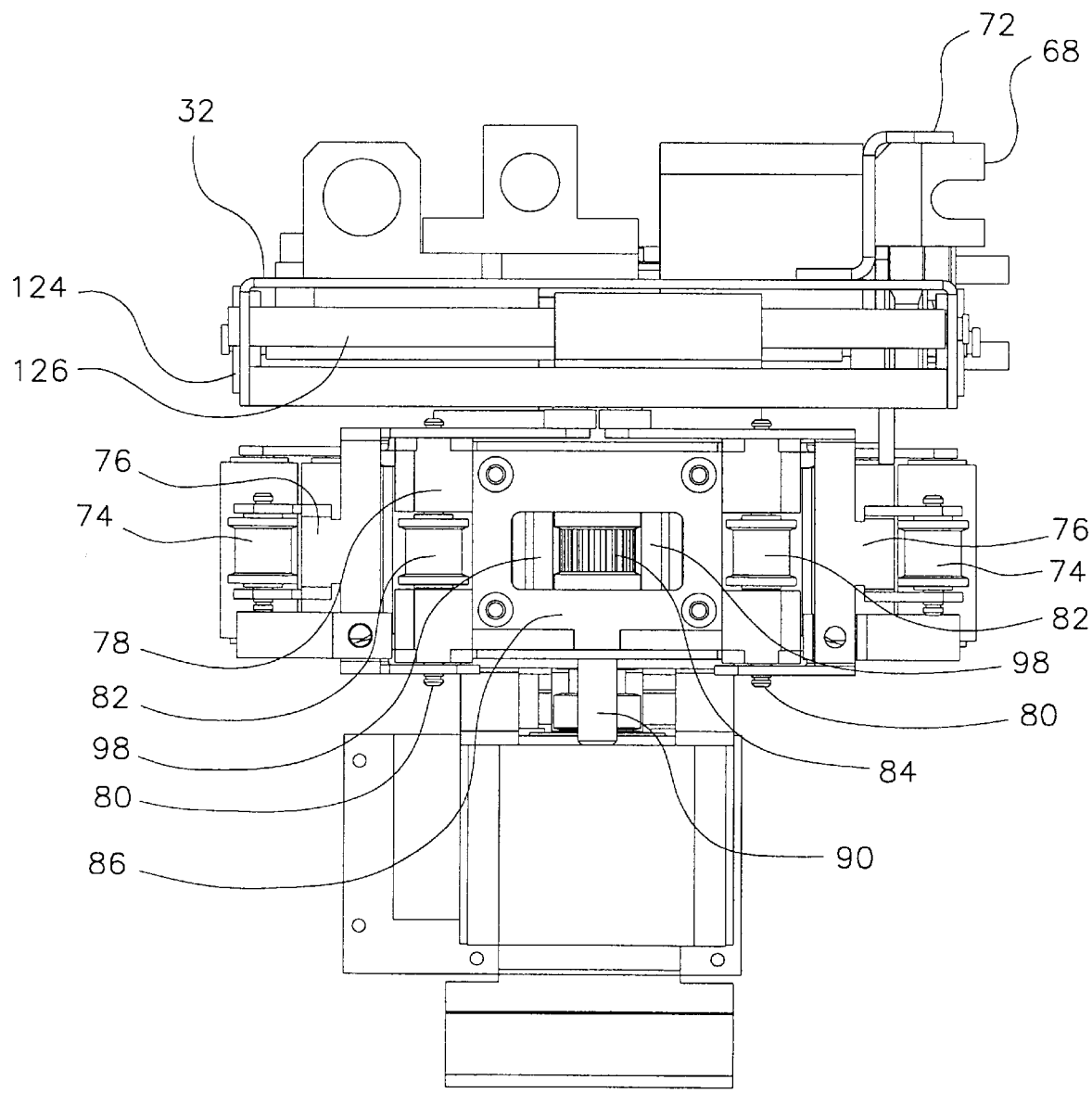
FIG. 6c is a right side elevational view of the elevator assembly.

The gripper is movable bidirectionally relative to the elevator platform in a +z and −z direction, as will be described in greater detail subsequently. A traction assembly having a friction drive belt and cooperating reaction rollers, mounted in spaced relation to receive a cartridge between the belt and rollers, provides the capability to frictionally engage cartridges in the library array and draw them through the gripper. The gripper belt drive train 34 incorporates peripheral rollers 74 which are mounted on pivoting brackets 76. These brackets are in turn mounted to the gripper frame 78 by pivot pins 80. Details of this structure are best seen in FIG. 6h. Inner rollers 82 are mounted coaxially with the pivot pins.

A drive capstan 84 is centrally mounted in the belt drive train, supported by a side cradle 86. The capstan includes a central drive gear, which engages the gripper belt 88 (shown in phantom in FIG. 6a), and upper and lower bearing mounts carried in the side cradle above and below the drive gear. The capstan shaft 90 extends below the side cradle to engage a pulley belt 92 driven by reversible stepper motor 94, which is mounted to a bottom plate 96 of the gripper frame. Two roll pins 98 are mounted in the side cradle on either side of the capstan, urging the gripper belt onto the drive gear and maintaining belt tension. In alternative embodiments, multiple rollers mounted on either side of the capstan drive gear in the side cradle maintain tension in the belt.

An inboard arm on each of the pivot brackets carries a linear cam follower 100 as best seen in FIG. 6h. During translation of the gripper assembly in the +/− z-axis directions, the cam followers are controlled by the contour of the race in linear cam block 102, best seen in FIGS. 6f and 6g. The outboard cam follower, with respect to the relative +/− z-axis motion of the gripper assembly, is driven into a laterally translated portion 104 of the linear cam for the extended portion of the gripper travel. Location of the cam follower opposite the pivot point from the peripheral roller urges the peripheral roller inward for increased pressure on a tape cartridge engaged by the gripper mechanism. Conversely, the inboard cam follower, relative to the direction of motion of the gripper mechanism, remains in the untranslated portion of the cam track. Adjustment of the center of pressure exerted by the gripper belt on a cartridge being manipulated is adjustable at the lateral extents of the +/− z-axis gripper motion by contouring of the linear cam track.

Figure 6D:
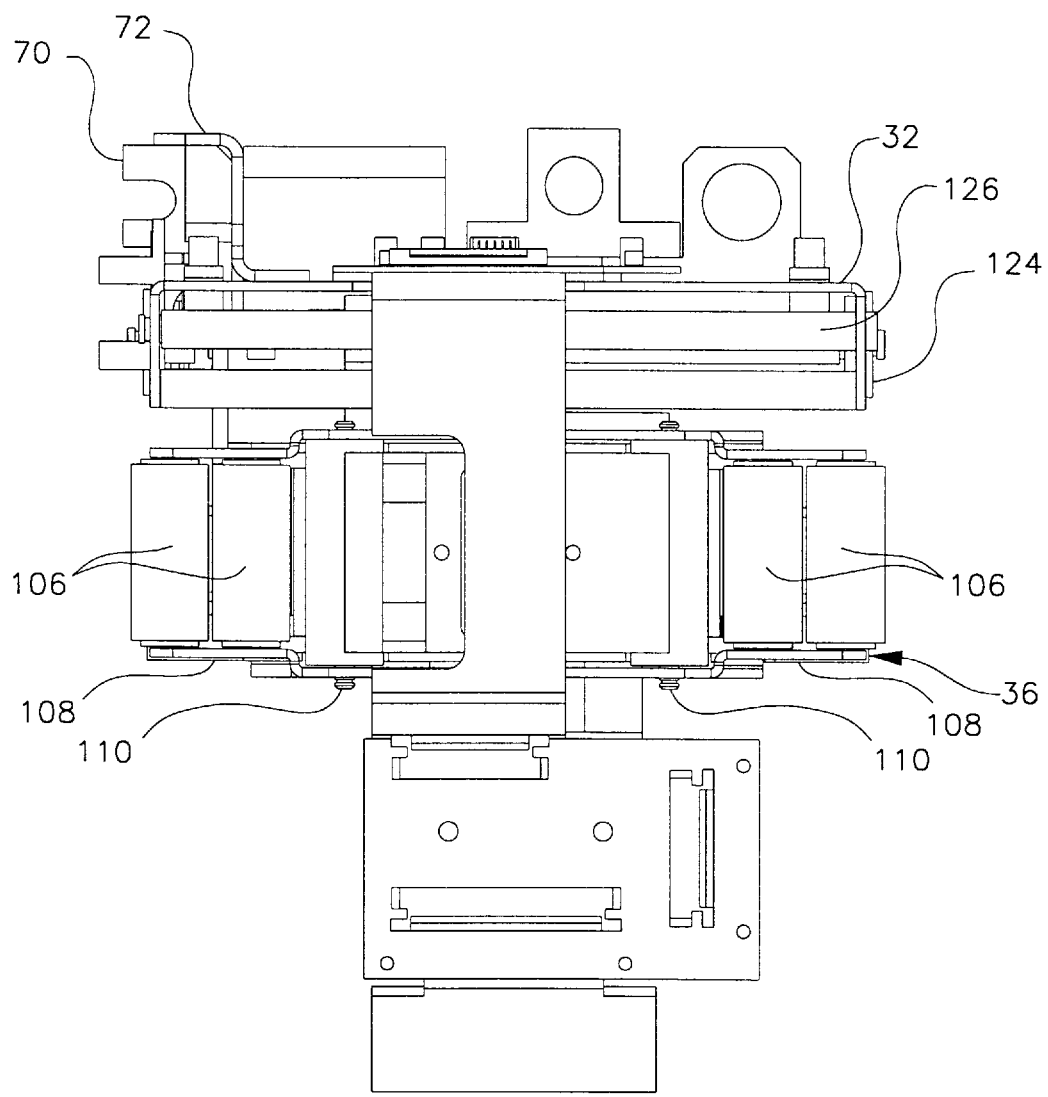
FIG. 6d is a left side elevational view of the elevator assembly.
Figure 6E:
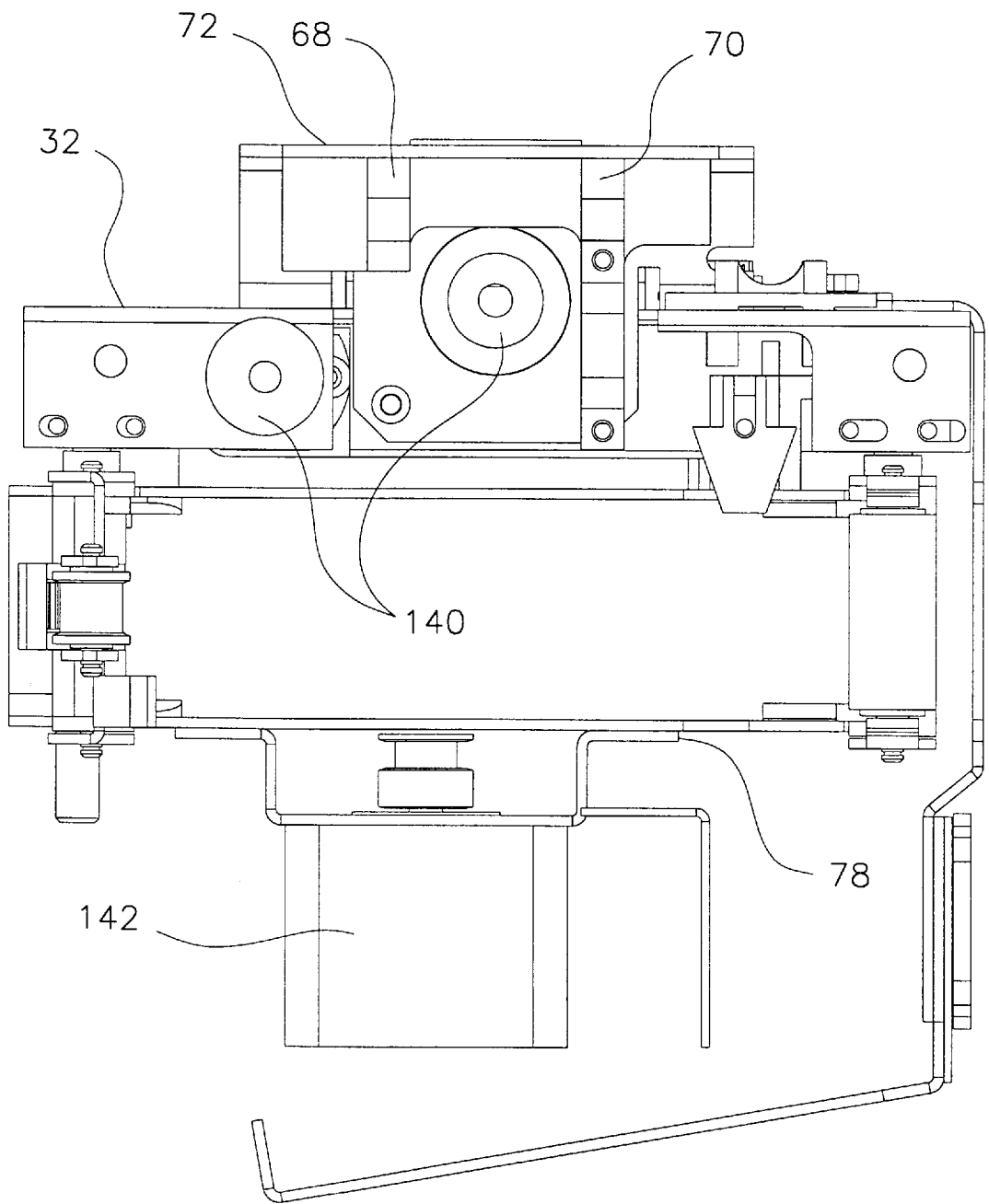
FIG. 6e is a rear view of the elevator assembly.
Figure 6G:
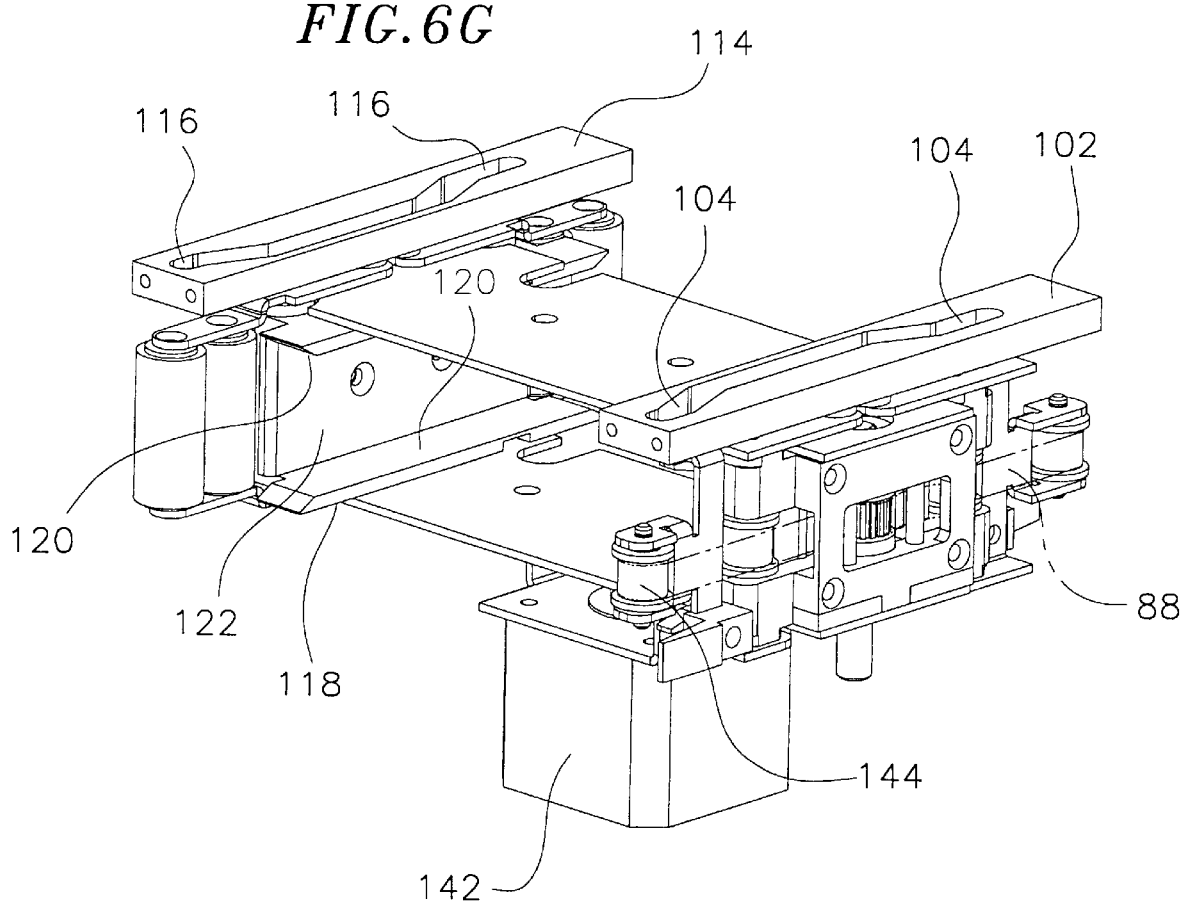
FIG. 6g is a front perspective view of the gripper assembly elements including linear cam blocks.
Figure 6H:
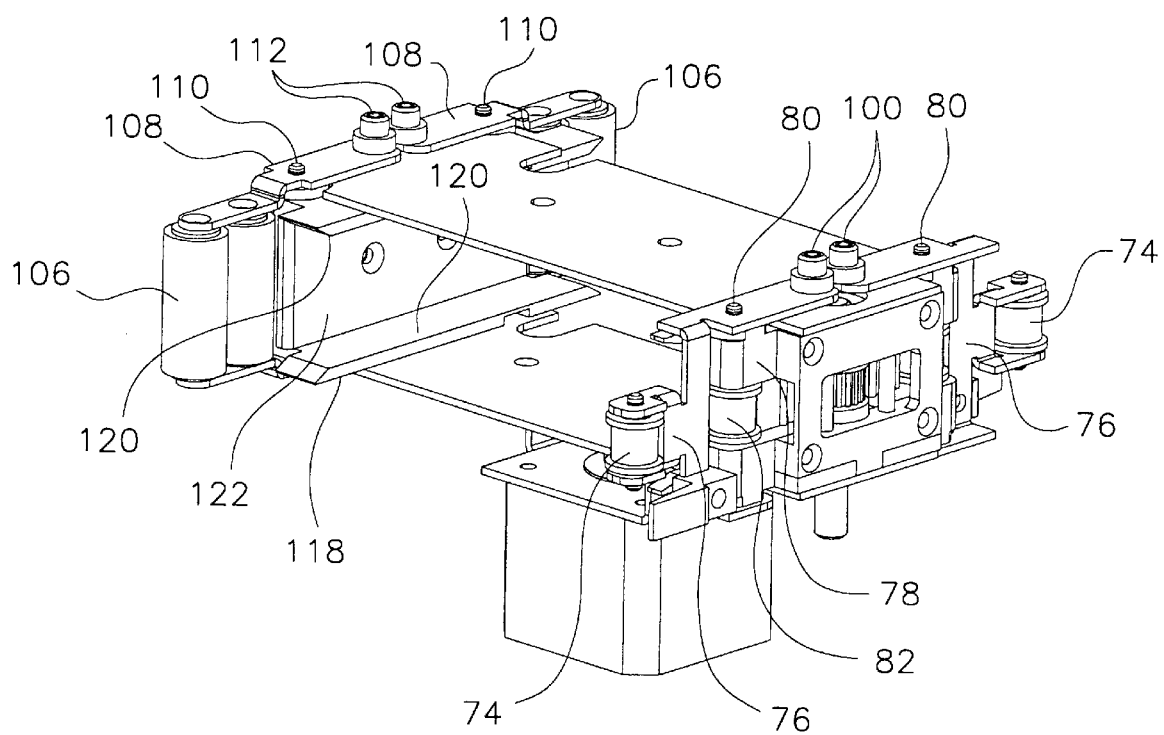
FIG. 6h is a front perspective view of the gripper assembly with the linear cam blocks removed to display the cam follower arrangement.

The reaction roller assembly 36 which cooperates with the belt drive train is best seen in FIGS. 6d and 6h. As with the belt drive train, cooperating reaction rollers 106 are mounted on pivoting brackets 108. The rollers are carried on an outboard arm of the bracket with respect to pivot pin 110 while the inboard arm of each of the pivoting brackets carries a cam follower 112 best seen in FIG. 6h. As previously described for the belt drive train, during translation of the gripper assembly in the +/− z-axis directions, a linear cam block 114, best seen in FIG. 6g, controls the cam followers such that the outboard cam follower with respect to the relative +/− z-axis motion is driven into laterally translated portions 116 of the cam track. Based on the location of the cam follower opposite the pivot point from the outboard rollers, the pivoting bracket urges the rollers inward, increasing pressure on the tape cartridge in cooperation with the outer roller of the belt drive assembly.

A cartridge guide 118, best seen in FIGS. 6g and 6h, incorporates vertically opposed slide plates 120 and a smooth vertical side wall 122 for guiding the tape cartridges while passing through the gripper unit. Sloped approach aprons on the upper and lower cartridge slide plates accommodates slight misalignment between the gripper assembly and cartridge while the gripper is drawing the cartridge into the gripper frame from either direction.

In an exemplary operating sequence, the gripper assembly is positioned adjacent a cartridge slot in one of the tape library magazines or the mailbox by the x-y positioning system. The gripper assembly is extended in the +z direction with the drive belt operating in a first direction, as will be described in greater detail subsequently. As the gripper mechanism approaches the extent of its +z motion, the cam followers on the drive belt roller brackets and reaction roller assembly brackets cause the belt and reaction rollers to "pinch" the cartridge which, urged by the drive belt rotated in a forward direction by the stepper motor, is withdrawn from its storage slot into the gripper assembly. The gripper assembly is then withdrawn to a zero position on the z-axis providing even force distribution between both sides of the belt train and roller assembly. The gripper mechanism is then positioned adjacent the cartridge aperture of one of the plurality of tape drives and the gripper assembly translates in the −z direction for affirmative positioning of the cartridge in the tape drive. As the cartridge enters the tape drive, the belt drive is engaged to pass the tape cartridge through the gripper mechanism. As the gripper assembly approaches the extent of its −z travel, the cam followers on the pivoting brackets urge the belt drive roller and outboard rollers into higher pressure contact with the tape cartridge providing affirmative motion control for insertion of the cartridge into the tape drive.

Upon ejection of the tape cartridge from the tape drive, the described manipulation process is reversed, with the belt driven by the stepper motor in a reverse direction, to return the cartridge to its magazine slot or other handling as appropriate. It should be noted that the cartridge manipulation system is available for handling of other cartridges with other tape drives during operation of the first drive.

The structure allowing z-axis motion of the gripper assembly relative to the elevator platform is best seen in FIGS. 6a, 6c, 6d and 6f. Depending sides 124 of the elevator platform support z-axis rails 126. A z-axis pillow block assembly 128 incorporates a linear bushing receiving the first z-axis rail while c-shaped gliders 130 engage the second z-axis rail. As with the support of the elevator assembly on the x-axis frame, the c-shaped gliders contact the rail only at the top tangency point and provide lateral tolerance for positioning of the z-axis rails.

The z-axis pillow block assembly and c-shaped gliders are integrally formed with or mounted to a z-axis mount plate 136. The gripper frame 78 is suspended from the z-axis mount plate. The z-axis pillow block assembly also engages a lead nut 132 which receives z-axis lead screw 134. The z-axis lead screw is supported by the depending elevator platform sides in appropriate bushings or bearings.

Linear cam blocks 102 and 114 are rigidly supported by the depending sides of the elevator platform vertically adjacent the z-axis guide rods.

A z-axis stepper motor 138, supported by the z-axis mount plate, drives the z-axis lead screw through a belt connecting pulleys 140 as best seen in FIG. 6e. A belt drive train stepper motor 142 is suspended from the bottom of the gripper frame and rotates the belt drive capstan through a drive belt engaging pulley 144. Placement of the two stepper motors on the top and bottom of the elevator assembly provides an exceptionally small footprint for the elevator assembly within the tape library.

X/Y POSITIONING SYSTEM

FIG. 5 displays the features of an x/y positioning system incorporating the present invention. The cantilevered mounting of x-axis frame 22 to y-axis pillow block 26 allows mounting of the x-axis stepper motor 200 substantially within the x-dimension of the frame. X-axis positioning of the elevator assembly is accomplished by the x-axis stepper motor driving lead screw 202 through a drive belt extending between pulleys 204. A lead nut engaging the lead screw is constrained in mounting block 206 which is fixed to the elevator platform 32. Reversible rotation of the lead screw by the x-axis stepper motor positions the elevator assembly at any desired location along the rails 64 in the x-axis frame.

Figure 4:
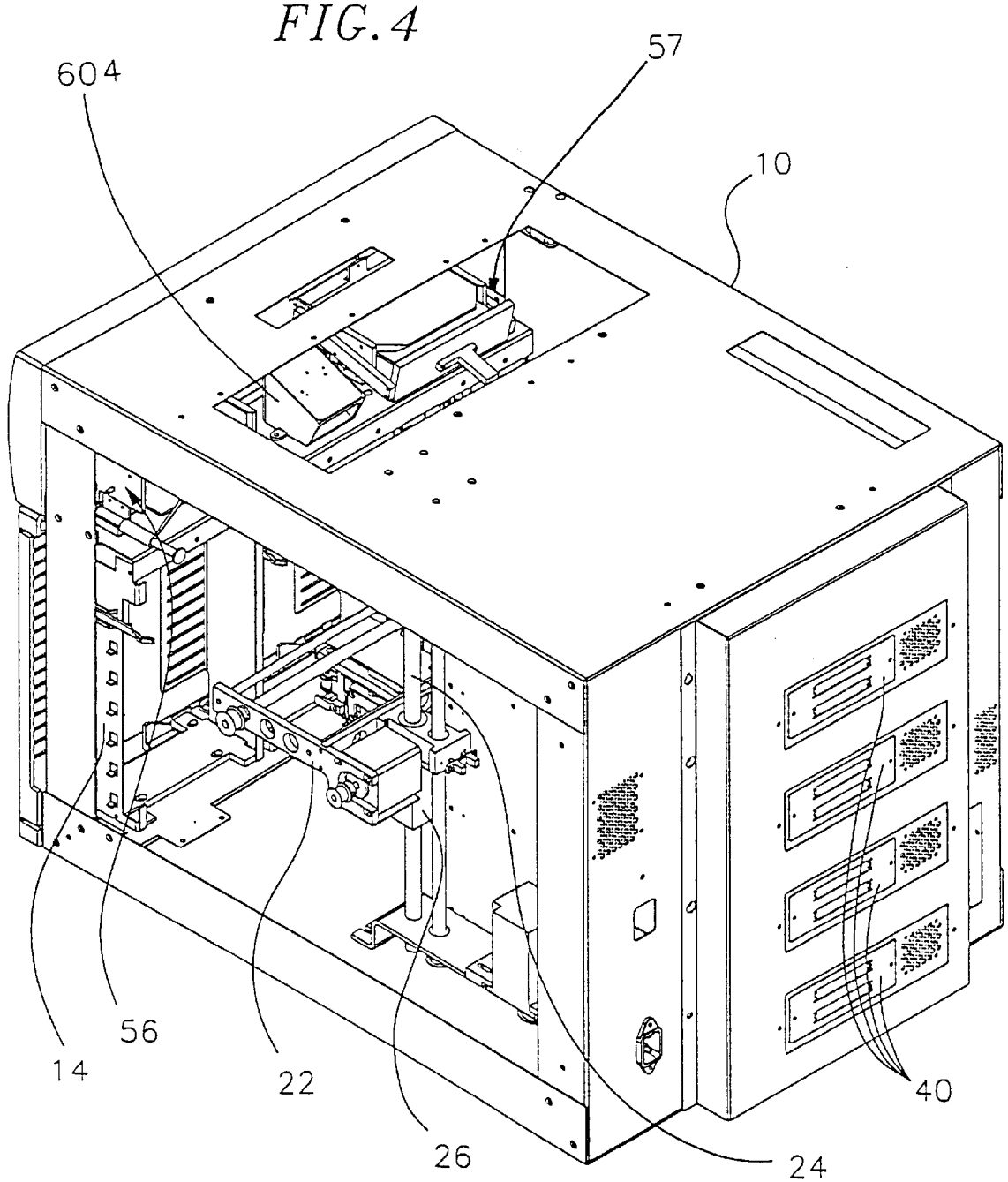
FIG. 4 is a left rear perspective of the tape library with the top and left side panels removed to display elements of the mailbox and cartridge retrieval mechanism.

Y-axis pillow block 26 incorporates a bearing receiving y-axis rail 24 and a lead nut engaging y-axis lead screw 208. A unitary support bracket 210 mounted to the floor of the tape library structure, as best seen in FIG. 4, supports the bottom of the y-axis rail and a bottom bearing 212 for the y-axis lead screw. A y-axis stepper motor 214 is mounted to an aft portion of the bracket and drives the y-axis lead screw through belt 216. A top bracket 218 mounted to the top of the library enclosure receives the top of the y-axis rail and houses a top bearing 220 for the y-axis lead screw.

Rotation of the x-axis frame about the y-axis rail is prevented by slotted glider 222 which is received on vertical flange 224 extending between the floor and top of the library enclosure as best seen in FIG. 1. The slotted glider or, alternatively, a bearing roller element, is attached to the back plate 226 of the x-axis frame proximate a first end plate 228 of the x-axis frame. The slotted glider provides for dimensional tolerance relief between the y axis rail and the vertical antirotation flange. The back plate 226 is mounted to pillow block 26. A second end plate 230 completes the x-axis frame with parallel guide rails 64 and x-axis lead screw 202 supported and constrained intermediate the end plates.

In the embodiment shown in the drawings, the x-axis stepper motor 200 is mounted intermediate the second end plate of the x-axis frame and the y-axis pillow block. Mounting of the motor inboard of the end plates, with the belt drive train nested against and parallel to one end plate, significantly reduces the x-axis footprint for the x/y positioning system reducing the overall width of the footprint for the tape library. Similarly, centrally cantilevered mounting of the x-axis frame to the y-axis rail through the pillow block allows mounting of the y-axis components in the third bay of the library enclosure adjacent the tape drive mounting frame, as best seen in FIG. 4. The dimensions required for the second bay in which the cartridge manipulation system operates is thereby reduced in both the x and z directions.

The x/y positioning system disclosed, in addition to providing an abbreviated x/z footprint for the manipulation on system, provides a substantially unlimited y-axis expansion capability. The y axis rail is extendable to the vertical extent of the y dimension of the cartridge storage array. Stacking of multiple tiers of three magazine frames, such as those disclosed in FIG. 1, allows library expansion while maintaining a reduced width footprint for mounting in conventional electronic racks.

MAILBOX ASSEMBLY AND CARTRIDGE STORAGE SYSTEM

The mailbox assembly previously described with respect to FIG. 3 is shown in detail in FIG. 7. In the embodiment shown in the drawings, the mailbox assembly is mounted in the tape library enclosure above the cartridge magazine frame. The mailbox assembly comprises a cartridge receiving box 300 having a front frame 302 mounted substantially flush with the front face of the tape library enclosure exposing the cartridge insertion and removal aperture 58, best seen in FIG. 1. As shown in FIGS. 7a and 7b, the front frame of the mailbox incorporates a mounting tab 304 to secure the mailbox to the front face of the tape library. Left side 306 and right side 308 extending rearward from the front frame support mailbox top 310 and are attached to mailbox floor 312. A cartridge inserted into the mailbox is received on shelves 314 spaced above the mailbox floor as best seen in FIG. 7b. A sloping engagement apron on the cartridge spacer shelves accommodates slight misalignment of the gripper assembly during passing of a tape cartridge from the gripper assembly to the mailbox. A pivoted door 316, best seen in FIG. 7a is attached to the mailbox sides by arms 318. The pivoting door precludes inadvertent access to the interior of the tape library preventing an operator from reaching through an open mailbox, or pushing a tape cartridge entirely through the mailbox. A contact lever 320 is attached to the door for engagement by the cartridge elevator assembly. The mailbox door is opened by positioning the elevator below the mailbox and raising the elevator to contact the lever causing the door to pivot to an open position as the elevator aligns the gripper assembly with the mailbox for extraction or replacement of a tape cartridge.

The mailbox incorporates a detent spring 322, which engages an indentation in the tape cartridge for positioning. An operator inserting a cartridge into the mailbox presses the cartridge to the detent, which abuts the end of the cartridge with the mailbox door providing sufficient exposure of the cartridge sides to allow contact by the gripper assembly extended in the +z direction. A cartridge positioned in the mailbox by the manipulation assembly for removal by the operator is positioned to the detent by the gripper assembly. A cam actuated cartridge ejection assembly 326 is then engaged by the gripper to urge the cassette to the outer detent position where it can be grasped by an operator and removed from the mailbox.

The cartridge ejection assembly is best seen in FIGS. 7b and 7c. A plunger 328 is reciprocally engaged by a barrel 330, which incorporates a spring urging the plunger into the extended position. A cartridge contact lever 340 extends from the plunger through a linear cam track 342 cut in the barrel wall. With the plunger in the extended position, the cam track rotates or retracts the lever downwardly to a position below the cartridge spacer shelves 314. Upon pressure from the gripper assembly in the +z direction urging the plunger into the barrel, the lever is moved from the downward position cam track portion 344 to an upward position cam track portion 346, which raises the lever into alignment for contact with the rear face of the cartridge. Continued motion by the gripper assembly in the +z direction urging the plunger further into the barrel causes the lever to force the cartridge outward in the mailbox to the outer detent position. Return of the gripper assembly to a zero position on the z-axis allows the plunger to return to its original position causing the lever to rotate downward in the cam track allowing a tape cartridge to be passed through the mailbox.

Figure 8A:
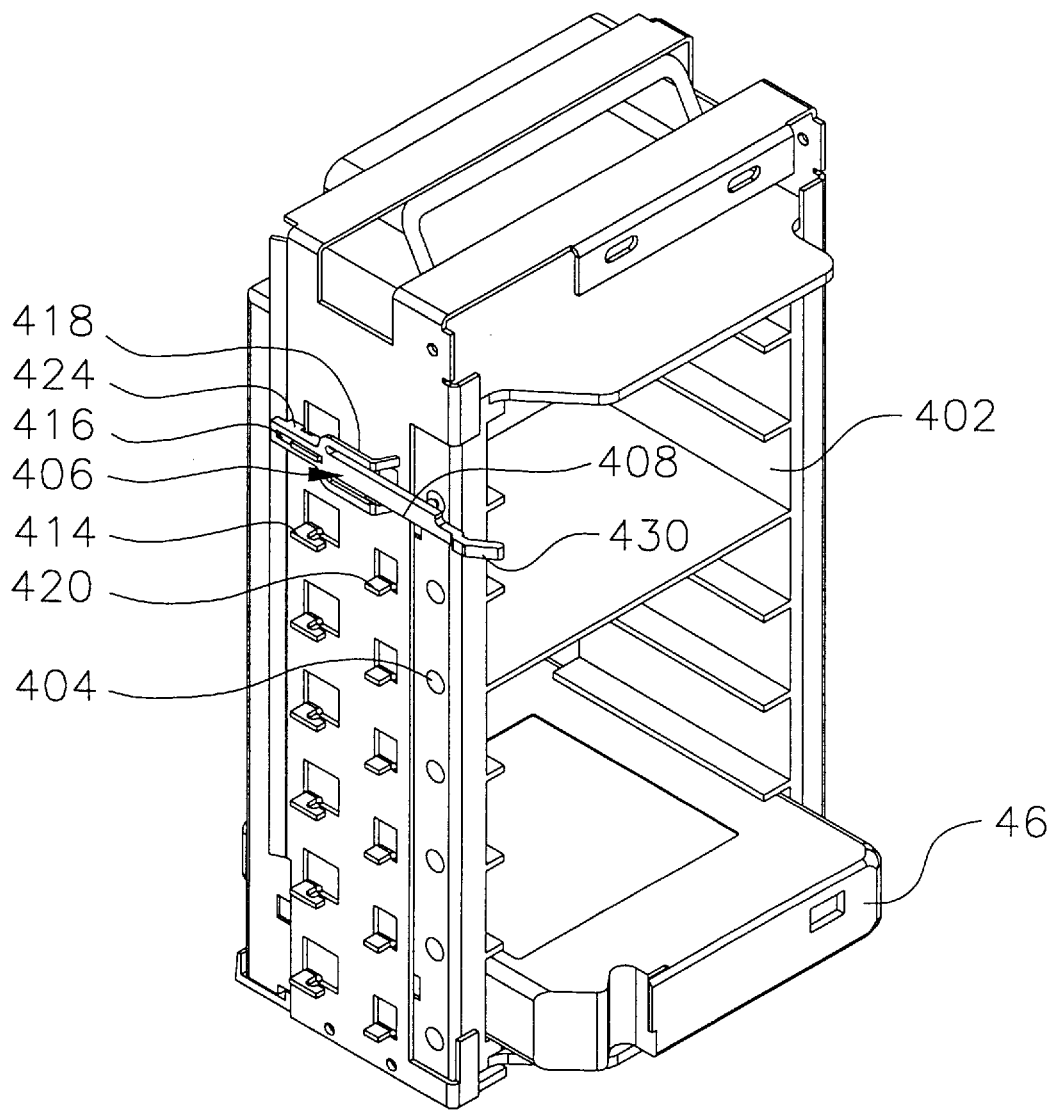
FIG. 8a is a rear perspective view of a cartridge magazine and associated frame.

Operator handling of tape cartridges may bypass the cartridge mailbox assembly as previously described. Cartridges may be manipulated by the operator in groups of seven by removal and insertion of cartridge magazines and individually from magazines, mounted in or removed from the library, by rotating the cartridge restraining bar on the magazine. As previously described, the magazine employed in the present invention has been employed on prior Philips LMS CSL systems. Details of the magazine and magazine frame employed in the present invention are shown in FIG. 8a. Tape cartridges 46 are received in slots 402 in the magazine. The magazine allows cartridges to be withdrawn from the front side of the magazine by the operator or the rear side of the magazine by the cartridge manipulation system in the tape library. Each magazine slot is provided with a cartridge securing system, which precludes inadvertent removal of cartridges from the magazine. The operator may remove a cartridge from the front face of the magazine by rotating the cartridge retaining bar 62. The retaining bar provides a physical barrier to removal of the cartridges in its closed position. In the open position, any of the seven cartridges in the magazine may be removed.

Figure 8B:
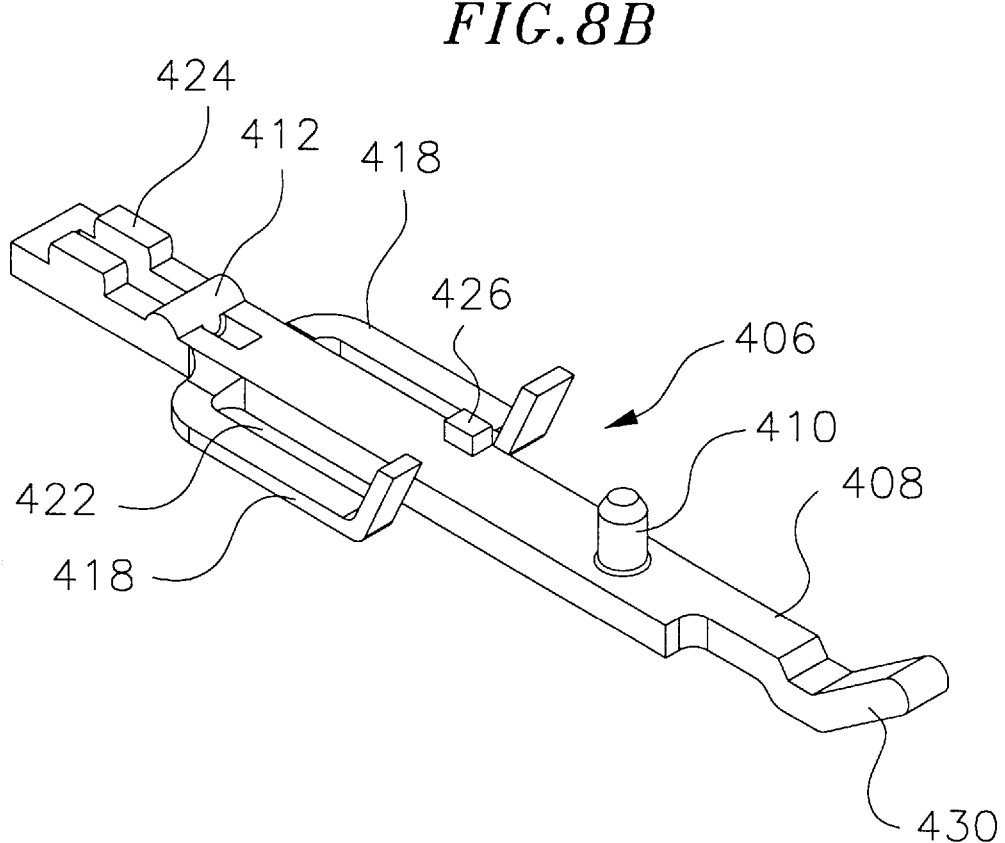
FIG. 8b is a detailed perspective view of a cartridge release actuator employed with the magazine and frame of the present invention.

A lever actuated retaining mechanism in each slot of the magazine precludes removal of individual cartridges from the back side of the magazine. Release of the lever actuated retaining mechanism is accomplished by insertion of a release pin through aperture 404 associated with each slot. In prior art embodiments a pin carried by the cartridge manipulation mechanism was employed to actuate the release. However, tolerance problems in alignment of such an actuation pin with the appropriate aperture precluded consistent satisfactory results. The present invention employs a plurality of release actuators 406 mounted to the magazine frame and individually associated with a slot of the magazine. Details of the actuator are shown in FIG. 8b.

The actuator incorporates a lever portion 408 on which release pin 410 is mounted. A pivot pin 412 is integrally formed in the actuator and is received by a J-clip 414, best seen in FIG. 8a, with the respective release actuator removed from the magazine frame. The J-clip extends through slot 416 in a tail portion of the actuator allowing rotational motion of the lever about the pin. Restoring force for the lever is provided through paired spring legs 418 extending peripherally from the lever. Depressing the lever, as will be described subsequently, imparts torsional forces to the attaching portions of the spring legs creating a restoring force upon release of the lever. An alignment tab 420 extending from the magazine frame, as best seen in FIG. 8a is received in slot 422 intermediate the release lever and one of the restoring spring legs. Motion of the release lever is constrained in the open position by stops 424 extending from the tail of the actuator for contact with the magazine frame and stop 426 in the closed position, which again contacts the side of the frame. A release lever is closed or depressed by contact from an actuation paddle 428 mounted on the pivoting frame of the gripper assembly, as best seen in FIG. 6a, with angled contact 430 extending from the end of the lever.

In retrieving a cartridge from the magazine, the gripper assembly is aligned with a cartridge slot by the elevator. Actuation of the gripper in the +z direction results in urging the pivoting brackets of the gripper assembly inward for contact with the cartridge thereby simultaneously urging the paddle inward contacting the lever and urging release pin 410 into the release aperture 404, freeing the cassette for removal from the magazine. Upon translation of the gripper in a −z direction, the paddle and hence release lever are relaxed outwardly thereby returning the lever to the unactuated position under restoring force from the spring legs 418. Vertical tolerance in the actuation of the release system is accommodated by the width of the actuation paddle on the gripper assembly. While slight horizontal misalignment is accommodated by the angle of the lever contact and the corresponding angle of the actuating paddle.

Configuration control for cartridges contained in the tape library is accomplished automatically by the system for cartridges inserted and removed through the mailbox. To reduce overhead in recovering configuration of the cartridge compliment in the library when magazines or cartridges are individually manipulated by an operator, the present invention incorporates door and magazine actuation sensors. A library door sensor 600 senses the open or closed position of library door 60. A magazine sensor 602 accomplishes a dual purpose sensing removal of the entire magazine and sensing actuation of the cartridge restraining bar without removal of the magazine from the tape library.

Figure 9:
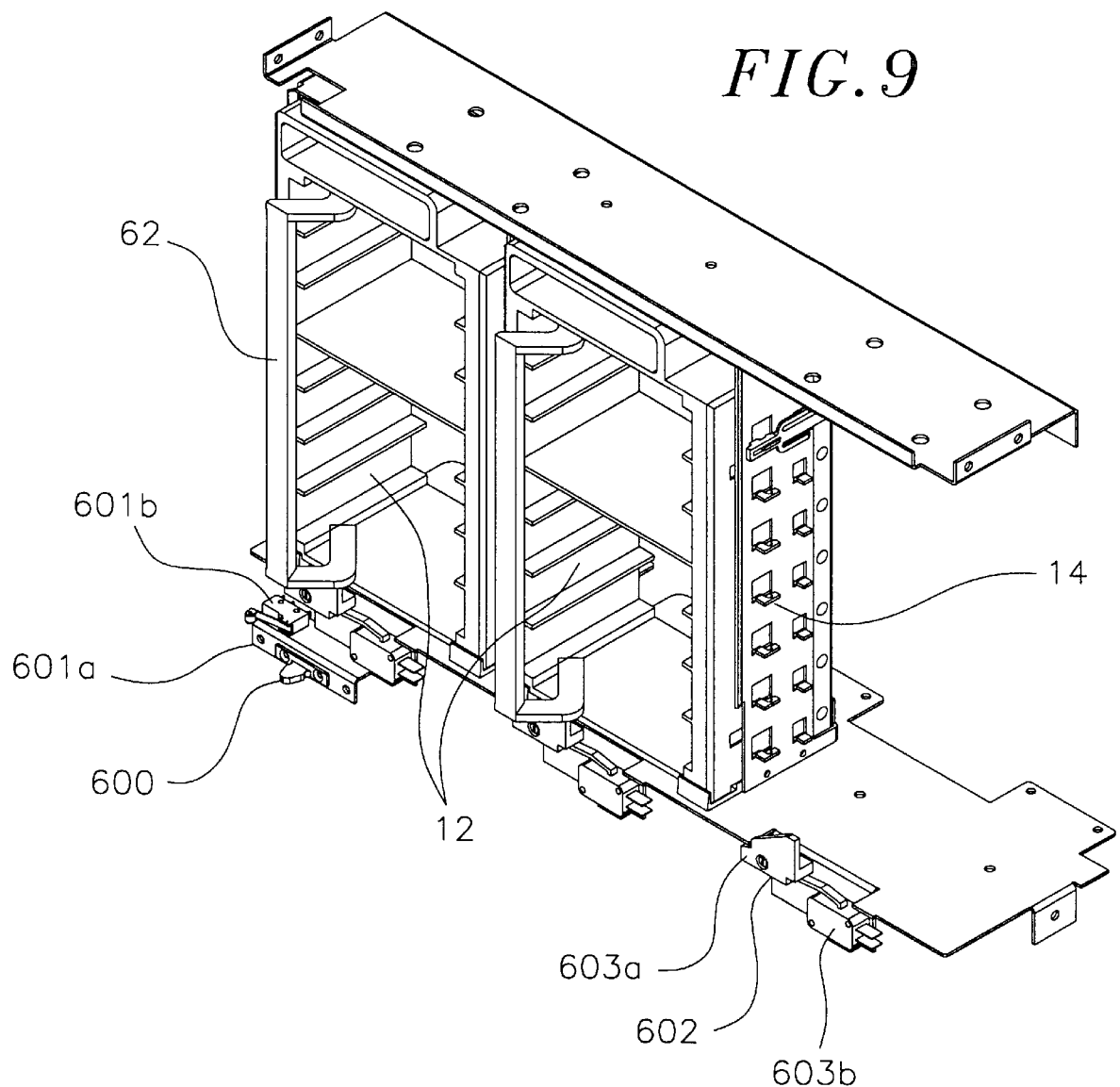
FIG. 9 is a partial perspective view of two magazines and associated frames employed in the tape library with associated sensing switch assemblies.

As best seen in FIG. 9, the magazine sensor comprises two elements for the embodiment disclosed in the drawings. A rotating cam 603a is engaged by the magazine closure bar and urged downward into contact with a microswitch 603b. Spring loading of the cam urges the cam upward into contact with the closure bar. When the closure bar is rotated to allow removal of a cartridge, the cam rotates upwardly, disengaging the microswitch which provides a signal to the tape library controller, indicating actuation of the magazine closure bar.

Similarly, the door closure switch comprises a strike plate and clasp 601a, which when engaged by mating tongs on the door, causes the door frame to depress microswitch 601b. A magnetic closure is alternatively employed to maintain the door closed, urging the door frame against the microswitch. Opening the tape library door activates the microswitch which in turn provides a signal to the tape library controller indicating a door open condition.

The central processing unit for the tape library logs a door open condition sensed by position switch 600. Similarly, actuation of a cartridge restraining bar or removal of a magazine is detected by one of the magazine switches and sensed by the CPU. Recovery of library configuration is accomplished by cataloging of cassettes in any magazine which has been removed or the restraining bar has been actuated. This approach reduces the overhead in reacquiring configuration control by limiting the cataloging to magazines that have been physically manipulated by an operator. For magazines which have not been so manipulated, prior configuration of the cartridges has not been disturbed.

Cataloging of cartridges in the library is accomplished through the use of a bar code scanner 604, best seen in FIG. 4. Cartridges retrieved from the library mailbox, "slot zero", or a magazine slot are positioned by the manipulation system in front of the sensor during configuration confirmation or initial insertion through the mailbox.

In the embodiment of the invention shown in the drawings, an active case scanner 604, best seen in FIG. 4, is mounted at the proper scan angle employing an insulating support box containing a scan window. Insulation of the active case, from the structure of the library, is required for electrical performance of the scanner and the enclosure, with scanning window, provides a dust free environment assuring performance of the scanner. Positioning of the scanner in the natural manipulation path of cartridges retrieved from or returned to the mailbox simplifies mechanical operation of the library.

As previously described, the tape library system maintains configuration control of the cartridges contained within magazines in the library. If the operator chooses to remove and/or insert cartridges directly into magazines in the library as opposed to inserting cartridges through the mailbox, the identity of the inserted or removed cartridges must be determined to maintain configuration control in the library. The present invention precludes the requirement for physically inventorying all cartridges present in the system by employing separate sensors for each magazine in the tape library and an initiating door position detector.

Figure 10:
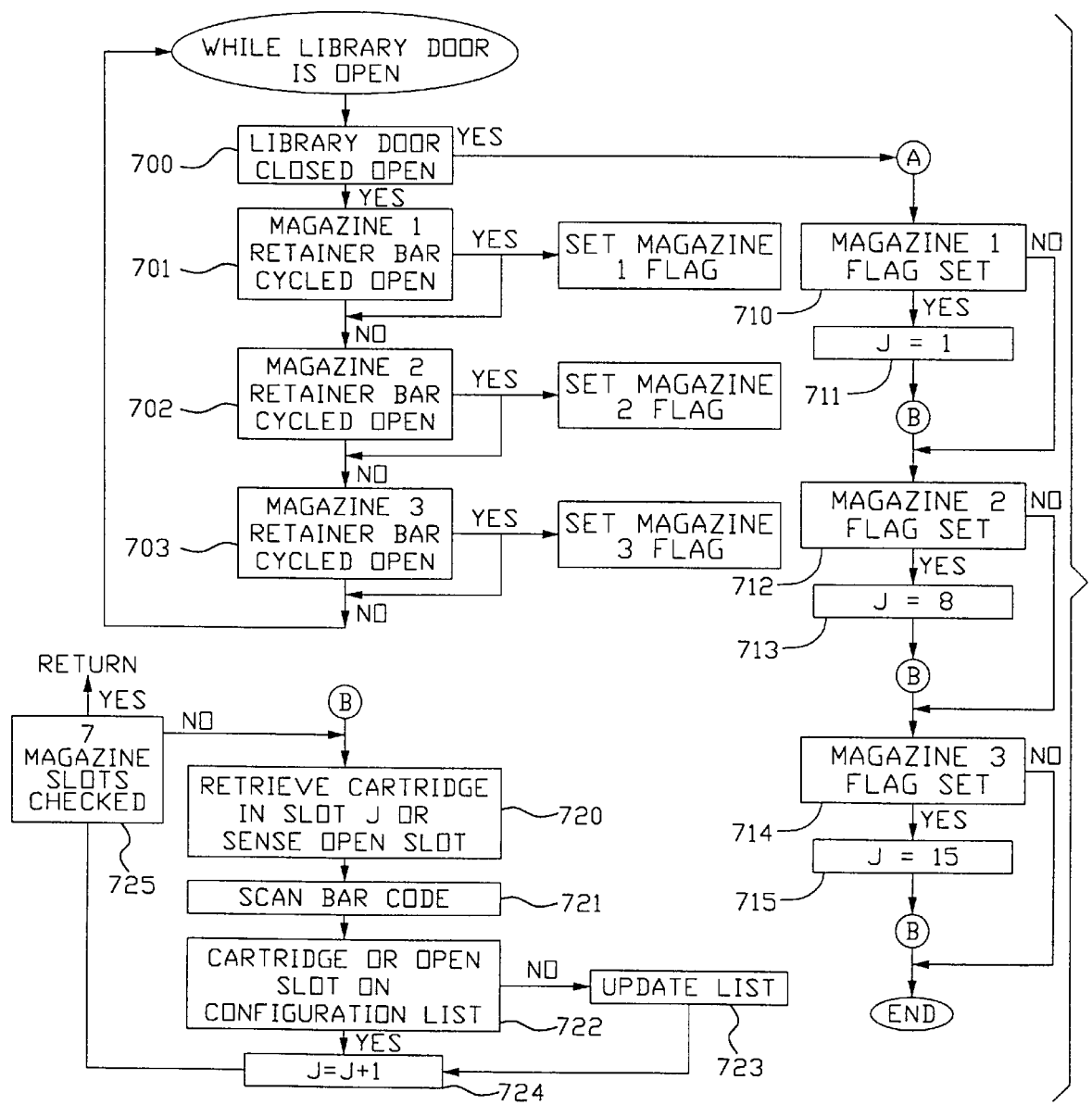
FIG. 10 is a flow chart demonstrating cartridge configuration control by the tape library system.

As shown in FIG. 10, if the operator opens the tape library door, the position detector is actuated which initiates the configuration routine and each magazine sensor is polled as identified in blocks 701–703. Upon closure of the tape library door, block 700, since each of the magazines is individually sensed to determine removal of the magazine as a whole or cycling of the cartridge retainer bar for removal of individual cartridges from the magazine, the configuration recovery system first samples the first magazine sensor to determine if the magazine has been removed or the retainer bar cycled, block 710. If the sensor indicates a signal, a routine is initiated for retrieving each cartridge in the magazine in sequence. A start address pointer is set in block 711 and the cartridge corresponding to the counter is retrieved from the magazine as shown in block 720. The cartridge manipulation system positions the cartridge in front of the bar code reader, which scans the bar code, block 721, and the cartridge is returned to the slot from which it was retrieved. The configuration system determines if the bar code scans corresponds to a cartridge currently identified in the configuration list in block 722 and if the cartridge is not one previously identified, a configuration list is updated in block 723. The counter is then incremented, block 724, and tested to determine if all slots in the magazine have been retrieved in block 725. For the present embodiment in which seven cartridges are present in each magazine, upon incrementing of the counter to a value of eight greater than the start address, the system returns to sense the second magazine as shown in block 712. If magazine two has a flag set, the counter is set, block 713, and the retrieval routine is initiated. If magazine two has not been removed or the retainer bar cycled, sensing of magazine three is accomplished in block 714. If magazine three has a flag set, the counter is set, block 715, and the retrieval routine is initiated.

Only magazines which have been physically manipulated by the operator are scanned thereby reducing time and complexity in recovering configuration control for the library.

Having now described the invention, as required by the patent statutes, those skilled in the art will recognize modifications and substitutions for the elements of the embodiments disclosed. Such modifications and substitutions are within the scope and intent of the invention as defined in the following claims.

What is claimed is:

1. An apparatus for manipulation of cartridges arranged in an x-y array in a tape library, the apparatus comprising:
   an x axis frame having a back plate terminating at a first end in a first end plate and at a second end in a second end plate;
   a pillow block mounted to the back plate intermediate the first and second ends;

a y axis rail received through the pillow block and extending from proximate a floor of a tape library to a vertical extent proximate a y dimension of an x-y array of cartridge storage locations, providing a centrally cantilevered mounting of the x axis frame;

means for preventing rotation of the x axis frame mounted proximate the first end of the back plate;

an x axis drive motor mounted intermediate the pillow block and the second end of the back plate;

means for mounting a cartridge elevator to the x axis frame that supports translating along the x axis;

means for translating the elevator operably interconnected to the x axis drive motor;

means for translating the pillow block on the y axis rail;

a gripper having a traction means for frictionally engaging a cartridge and drawing said cartridge through the gripper;

means for mounting the gripper to the cartridge elevator, said mounting means bidirectionally translatable in a z axis perpendicular to an x-y array of cartridges; and means for translating the mounting means.

2. An apparatus as defined in claim 1 where the gripper includes a frame and the traction means comprises:

a belt drive train mounted to a first side of the gripper frame, said drive train carrying a belt for frictionally engaging a cartridge; and a roller assembly mounted to a second side of the gripper frame opposite the belt drive train in spaced relation to cooperatively engage a second side of the cartridge.

3. An apparatus as defined in claim 2 wherein the belt drive train comprises:

a first peripheral roller supporting the drive belt and carried by a bracket pivotally mounted to the gripper frame;

means for pivoting the first bracket to urge the first roller and drive belt into firm engagement with the cartridge;

a second peripheral roller supporting the drive belt and carried by a second bracket pivotally mounted to the gripper frame opposite the first bracket; and means for pivoting the second bracket to urge the second peripheral roller and drive belt into firm engagement with the cartridge.

4. An apparatus as defined in claim 3 wherein the means for pivoting the first bracket is actuated cooperatively with translation of the mounting means in a first direction in the z-axis and the means for pivoting the second bracket is actuated cooperatively with translation of the mounting means in a second direction on the z-axis.

5. An apparatus as defined in claim 4 further comprising a reaction roller assembly comprising:

at least one reaction roller carried by a first roller bracket pivotally mounted to the gripper frame;

at least one reaction roller carried by a second roller bracket pivotally mounted to the gripper frame opposite the first roller bracket;

means for pivoting said first roller bracket to urge the roller carried thereby into firm engagement with the cartridge;

means for pivoting the second roller bracket to urge the roller carried thereby into firm engagement with the cartridge; and wherein the means for pivoting the first roller bracket is actuated cooperatively with translation of the mounting means in a first direction in the z-axis and the means for pivoting the second roller bracket is actuated cooperatively with translation of the mounting means in a second direction on the z-axis.

6. An apparatus as defined in claim 5 wherein the means for pivoting the first bracket comprises a first cam follower said means for pivoting the second bracket comprises a second cam follower, the means for pivoting the first roller bracket comprises a third cam follower and the means for pivoting the second roller comprises a fourth cam follower and further comprising:

a first cam race mounted to the elevator and receiving the first and second cam followers;

a second cam race mounted to the elevator and receiving the third and fourth cam followers;

the contours of said first cam race and said second cam race cooperatively positioned to simultaneously urge the first peripheral roller with the supported belt and first reaction roller into firm engagement with the cartridge upon translation of the gripper in the +z direction, thereby pinching the cartridge; and the contours of the first cam race and second cam race cooperatively positioned to simultaneously urge the second peripheral roller with the supported belt and second reaction roller into firm engagement with the cartridge to pinch the cartridge upon translation of the gripper in the −z direction.

7. An apparatus as defined in claim 3 wherein the roller assembly comprises:

at least one reaction roller carried by a first roller bracket pivotally mounted to the gripper frame;

at least one reaction roller carried by a second roller bracket pivotally mounted to the gripper frame opposite the first roller bracket;

means for pivoting said first roller bracket to urge the roller carried thereby into firm engagement with the cartridge; and means for pivoting the second roller bracket to urge the roller carried thereby into firm engagement with the cartridge.

8. An apparatus as defined in claim 7 wherein the means for pivoting the first roller bracket is actuated cooperatively with translation of the mounting means in a first direction in the z-axis and the means for pivoting the second roller bracket is actuated cooperatively with translation of the mounting means in a second direction on the z-axis.

9. An apparatus as defined in claim 3 wherein the belt drive train further comprises a first inner roller mounted coaxially with a pivot pin engaging the first bracket to the frame and a second inner roller mounted coaxially with a second pivot pin engaging the second bracket to the gripper frame.

10. An apparatus as defined in claim 9 further comprising a drive means comprising:

a capstan centrally mounted between the first and second inner rollers; and a belt stepper motor operatively engaged to drive the capstan.

11. An apparatus as defined in claim 1 wherein the gripper includes a frame and the mounting means comprises:

slide rails mounted to the elevator in parallel spaced relation;

a pillow block mounted to the gripper frame and slidably receiving one of said rails; and at least one glider mounted to the gripper frame for sliding engagement on a second rail, said glider tangentially contacting said second rail perpendicular to the z-axis.

12. An apparatus as defined in claim 11 wherein the translating means comprises:
   a lead screw parallel to the slide rails and rotatably carried by the elevator;
   a lead nut mounted to the gripper frame and operable receiving the lead screw; and
   a reversible z-axis stepper motor operatively engaged to the lead screw.

13. An apparatus as defined in claim 12 wherein the z-axis stepper motor and a belt stepper motor are mounted above and below the gripper frame.

14. An apparatus as defined in claim 1 wherein the means for preventing rotation comprises a slotted glider mounted to the back plate, said glider receiving a vertical flange extending from the floor of the tape library.

15. An apparatus as defined in claim 1 wherein the means for mounting the cartridge elevator comprises:
   first and second x-axis guide rails mounted in parallel spaced relation intermediate the first end plate and second end plate;
   a linear bearing mounted to the elevator and receiving the first guide rail; and
   at least one slider mounted to the elevator and slidably contacting the second guide rail tangentially proximate the top of the rail.

16. An apparatus as defined in claim 15 wherein the means for translating the elevator comprises:
   a lead screw rotatably mounted intermediate the first end plate and second end plate substantially parallel to the first and second guide rails;
   a lead nut mounted to the elevator platform and engaging the lead screw; and
   a belt drive interconnecting the x-axis drive motor and lead screw, said belt drive oriented proximate and substantially parallel to the second end plate.

17. An apparatus as defined in claim 1 wherein the means for translating of the pillow block comprises a y-axis lead screw mounted proximate and substantially parallel to the y-axis rail;
   a lead nut operably engaging the lead screw and constrained within the pillow block; and
   means for reversibly rotating the y-axis lead screw.

18. An apparatus as defined in claim 17 wherein the means for reversibly rotating the lead screw comprises:
   a reversible y-axis stepper motor; and
   a y-axis belt drive interconnecting the stepper motor and y-axis lead screw.

19. An apparatus as defined in claim 18 wherein the y-axis rail, y-axis lead screw and y-axis stepper motor are substantially aligned perpendicular to the back plate of the x-axis frame.

20. An apparatus as defined in claim 18 further comprising a unitary bracket mounted to the floor, said bracket mounting the y-axis rail and rotatably supporting the y-axis lead screw and wherein the y-axis stepper motor is mounted to said bracket substantially in alignment with the y-axis rail and y-axis lead screw, said alignment substantially perpendicular to the back plate of the x-axis frame.

21. An apparatus as defined in claim 1 further comprising:
   a mailbox for receiving and disgorging cartridges from the tape library, said mailbox having
      an aperture in an exposed face of the library,
      means for blocking access to an interior bay of the tape library, said blocking means moveable by contact with a cartridge manipulation system for passing cartridges through the mailbox, and
      means for ejecting cartridges inserted into the mailbox, said ejecting means operative through engagement with the gripper.

22. An apparatus as defined in claim 21 wherein the mailbox includes a rectangular frame, and wherein the blocking means comprises a rear door pivotally mounted to at least one side of the rectangular frame and having a projecting contact lever adapted for engagement by a surface on the elevator system whereby translation of the elevator subsequent to contact of the lever rotates the door to expose a rear aperture in the frame permitting translation of a cartridge to or from the mailbox.

23. An apparatus as defined in claim 21 wherein the mailbox includes a rectangular frame and the ejecting means comprises:
   a barrel incorporating a linear cam track mounted proximate one corner of the frame;
   a plunger received within the barrel for reciprocating movement from an extended position to a depressed position;
   a lever extending from the plunger through the linear cam, the linear cam track urging the lever into a first retracted position with the plunger in an extended condition allowing clear translation of a cartridge through the mailbox frame and urging the lever into a raised position during motion of the plunger from said extended position to said depressed position for contact of a rear face of a cartridge present in the mailbox frame, said lever urging the cartridge outwardly from the mailbox frame upon continued motion of the plunger toward the depressed position; and
   means for operative engagement of the plunger by the gripper whereby translation of the gripper urges the plunger from the extended position to the depressed position.

24. An apparatus as defined in claim 22 further comprising at least one spacer platform mounted to a bottom of the mailbox frame for supporting a cartridge therein and wherein the ejecting means is mounted to the mailbox frame proximate a bottom corner of the frame and the linear cam race is profiled to provide retraction of the lever below a top surface of the spacer with the plunger in the extended position.

25. An apparatus as defined in claim 1 further comprising a cartridge release for tape library magazines having vertically spaced cartridge storage slots employing a release aperture for cartridges stored therein, the cartridge release having:
   a frame surrounding a cartridge magazine having a release aperture;
   a release actuator incorporating a lever portion;
   a pivot pin integrally formed in the actuator intermediate the lever portion and a tail portion of the actuator;
   a J-clip extending from the frame and engaging the pivot pin;
   at least one resilient leg extending from the actuator proximate the pivot pin said resilient leg imparting a torsional restoring force to said actuator upon movement of the lever portion to a depressed position;
   a first stop extending from the tail portion of the actuator to contact the frame with the lever portion in an undepressed position;
   a release pin mounted to the lever portion for operative engagement with the release aperture of the magazine with the lever portion in the depressed position; and means for engaging the lever portion mounted to the gripper wherein the gripper includes means for contacting the engaging means to urge the lever portion to the depressed position.

26. A apparatus as defined in claim 25 wherein the tail portion includes a slot abutting the pivot pin and receiving the J-clip therethrough for engagement of the pivot pin.

27. An apparatus as defined in claim 25 wherein the resilient restoring leg comprises:

a lever portion extending substantially parallel to the actuator lever portion and terminating in a standoff foot; and a resilient portion extending substantially perpendicular to the lever portion and actuator lever portion proximate the pivot pin and further comprising an alignment tab extending from the frame intermediate the actuator lever portion and lever portion.

28. An apparatus as defined in claim 25 wherein the engaging means comprises an angled contact extending from an end of the actuator lever opposite the actuator tail portion, said contact extending at an angle inward toward said frame and a contact paddle mounted on the gripper and having a complementary angle to accommodate misalignment.

29. An apparatus as defined in claim 28 wherein the contact paddle has a vertical dimension predetermined to accommodate alignment tolerance between the gripper and actuator lever portion during x-y translation of the elevator.

30. An apparatus as defined in claim 25 further comprising a second stop extending from the actuator lever portion intermediate the pivot pin and release pin for contact on the frame with the actuating lever portion in the depressed position.

31. An apparatus as defined in claim 1 further comprising:

a plurality of removable cartridge storage magazines arranged in an x-y array and each having a plurality of vertically spaced cartridge storage slots; and means for preventing removal of cartridges from a front of the magazine said preventing means moveable for manually extracting cartridges;

means for sensing presence of the preventing means for each of said plurality of magazines in a closed position said sensing means actuated by opening of the preventing means or removal of said each magazine; and means for inventorying cartridges present in a magazine responsive to actuation of said sensing means corresponding to the magazine.

32. A configuration control system as defined in claim 31 wherein the preventing means comprises a bar rotatably mounted to each magazine and extending substantially the vertical extent of the magazine, said bar rotatable from a closed position abutting an exposed end of cartridges present in the magazine to an open position exposing the cartridges for removal from the magazine and said sensing means comprises:

a cam actuated by rotation of the closure bar to the open position and further actuated by removal of the magazine from the tape library; and a microswitch responsive to actuation of the cam.

33. An apparatus as defined in claim 32 further comprising:

a closure door for the library, moveable from a closed position to an open position, said door covering the fronts of said magazines in said closed position; and means for detecting door position, said detecting means actuated by movement of the door from the closed position to the open position and wherein the means for determining cartridge configuration is further responsive to actuation of said detecting means.

34. An apparatus for manipulation of cartridges arranged in an x-y array in a tape library, the apparatus comprising:

an x axis frame having a back plate terminating at a first end in a first end plate and at a second end in a second end plate;

a pillow block mounted to the back plate intermediate the first and second ends;

a y axis rail received through the pillow block and extending from proximate a floor of a tape library to a vertical extent proximate a y dimension of an x-y array of cartridge storage locations, providing a centrally cantilevered mounting of the x axis frame;

means for preventing rotation of the x axis frame mounted proximate the first end of the back plate;

an x axis drive motor mounted intermediate the pillow block and the second end of the back plate;

means for mounting a cartridge elevator to the x axis frame that supports translating motion along the x axis;

means for translating the elevator operably interconnected to the x axis drive motor; and means for translating the pillow block on the y axis rail; and a gripper to engage and pass through cartridges, said gripper reciprocally mounted to the elevator for translation in a +z and −z direction.

35. An apparatus as defined in claim 34 further comprising:

a mailbox for receiving and disgorging cartridges from the tape library, said mailbox having an aperture in an exposed face of the library, means for blocking access to an interior bay of the tape library, said blocking means moveable by contact with a cartridge manipulation system for passing cartridges through the mailbox, and means for ejecting cartridges inserted into the mailbox, said ejecting means operative through engagement with the gripper.

36. An apparatus as defined in claim 35 wherein the mailbox includes a rectangular frame, and wherein the blocking means comprises a rear door pivotally mounted to at least one side of the rectangular frame and having a projecting contact lever adapted for engagement by a surface on the elevator system whereby translation of the elevator subsequent to contact of the lever rotates the door to expose a rear aperture in the frame permitting translation of a cartridge to or from the mailbox.

37. An apparatus as defined in claim 35 wherein the mailbox includes a rectangular frame and the ejecting means comprises:

a barrel incorporating a linear cam track mounted proximate one corner of the frame;

a plunger received within the barrel for reciprocating movement from an extended position to a depressed position;

a lever extending from the plunger through the linear cam track, the linear cam track urging the lever into a first retracted position with the plunger in an extended condition allowing clear translation of a cartridge through the mailbox frame and urging the lever into a raised position during motion of the plunger from said extended position to said depressed position for contact of a rear face of a cartridge present in the mailbox frame, said lever urging the cartridge outwardly from the mailbox frame upon continued motion of the plunger toward the depressed position; and means for operative engagement of the plunger by the gripper whereby translation of the gripper urges the plunger from the extended position to the depressed position.

38. An apparatus as defined in claim 37 further comprising at least one spacer platform mounted to a bottom of the mailbox frame for supporting a cartridge therein and wherein the ejecting means is mounted to the mailbox frame proximate a bottom corner of the frame and a linear cam race is profiled to provide retraction of the lever below a top surface of the spacer with the plunger in the extended position.

39. An apparatus as defined in claim 34 further comprising a cartridge release for tape library magazines having vertically spaced cartridge storage slots employing a release aperture for cartridges stored therein, the cartridge release having:

a frame surrounding a cartridge magazine having a release aperture;

a release actuator incorporating a lever portion;

a pivot pin integrally formed in the actuator intermediate the lever portion and a tail portion of the actuator;

a J-clip extending from the frame and engaging the pivot pin;

at least one resilient leg extending from the actuator proximate the pivot pin, said resilient leg imparting a torsional restoring force to said actuator upon movement of the lever portion to a depressed position;

a first stop extending from the tail portion of the actuator to contact the frame with the lever portion in an undepressed position;

a release pin mounted to the lever portion for operative engagement with the release aperture of the magazine with the lever portion in the depressed position; and means for engaging the lever portion mounted to the gripper wherein the gripper includes means for contacting the engaging means to urge the lever portion to the depressed position.

40. A apparatus as defined in claim 39 wherein the tail portion includes a slot abutting the pivot pin and receiving the J-clip therethrough for engagement of the pivot pin.

41. An apparatus as defined in claim 39 wherein the resilient restoring leg comprises:

a lever portion extending substantially parallel to the actuator lever and terminating in a standoff foot; and a resilient portion extending substantially perpendicular to the lever portion and actuator lever portion proximate the pivot pin and further comprising an alignment tab extending from the frame intermediate the actuator lever portion and lever portion.

42. An apparatus as defined in claim 39 wherein the engaging means comprises an angled contact extending from an end of the actuator lever portion opposite the actuator tail portion, said contact extending at an angle inward toward said frame and a contact paddle mounted on the gripper and having a complementary angle to accommodate misalignment.

43. An apparatus as defined in claim 42 wherein the contact paddle has a vertical dimension predetermined to accommodate alignment tolerance between the gripper and actuator lever portion during x-y translation of the elevator.

44. An apparatus as defined in claim 39 further comprising a second stop extending from the actuator lever portion intermediate the pivot pin and release pin for contact on the frame with the actuating lever portion in the depressed position.

45. An apparatus as defined in claim 34 further comprising:

a plurality of removable cartridge storage magazines arranged in an x-y array and each having
a plurality of vertically spaced cartridge storage slots; and
means for preventing removal of cartridge from a front of the magazine said preventing means moveable for manually extracting cartridges;

means for sensing presence of the preventing means or each of said plurality of magazines in a closed position said sensing means actuated by opening of the preventing means or removal of said each magazine; and means for inventorying cartridges present in a magazine responsive to actuation of said sensing means corresponding to the magazine.

46. A configuration control system as defined in claim 45 wherein the preventing means comprises a bar rotatably mounted to each magazine and extending substantially the vertical extent of the magazine, said bar rotatable from a closed position abutting an exposed end of cartridges present in the magazine to an open position exposing the cartridges for removal from the magazine and said sensing means comprises:

a cam actuated by rotation of the closure bar to the open position and further actuated by removal of the magazine from the tape library; and a microswitch responsive to actuation of the cam.

47. An apparatus as defined in claim 46 further comprising:

a closure door for the library, moveable from a closed position to an open position, said door covering the fronts of said magazines in said closed position; and means for detecting door position, said detecting means actuated by movement of the door from the closed position to the open position and wherein the means for inventorying cartridges is further responsive to actuation of said detecting means.

* * * * *